United States Patent
Li et al.

(10) Patent No.: US 11,286,416 B2
(45) Date of Patent: *Mar. 29, 2022

(54) SURFACTANT COMPOSITION AND PREPARATION METHOD THEREFOR AND APPLICATION THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Yingcheng Li, Shanghai (CN); Songyuan Gu, Shanghai (CN); Weidong Zhang, Shanghai (CN); Xinning Bao, Shanghai (CN); Ou Sha, Shanghai (CN); Zhiqin Shen, Shanghai (CN); Yiqing Yang, Shanghai (CN); Xiaodong Zhai, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(*) Notice: Subject to any disclaimer, the term of this patent is extended or adjusted under 35 U.S.C. 154(b) by 12 days.

This patent is subject to a terminal disclaimer.

(21) Appl. No.: 16/691,300

(22) Filed: Nov. 21, 2019

(65) Prior Publication Data
US 2020/0087570 A1   Mar. 19, 2020

Related U.S. Application Data

(63) Continuation of application No. 15/502,194, filed as application No. PCT/CN2014/000762 on Aug. 12, 2014, now Pat. No. 10,526,528.

(51) Int. Cl.
C09K 8/584 (2006.01)

(52) U.S. Cl.
CPC .................. *C09K 8/584* (2013.01)

(58) Field of Classification Search
CPC ................ C09K 8/584; E21B 43/16
See application file for complete search history.

(56) References Cited

U.S. PATENT DOCUMENTS

| | | | | |
|---|---|---|---|---|
| 4,138,345 A | * | 2/1979 | Williams | C09K 8/584 |
| | | | | 166/270.1 |
| 4,147,211 A | * | 4/1979 | Sandiford | C09K 8/50 |
| | | | | 166/268 |
| 4,264,457 A | | 4/1981 | Beeks et al. | |
| 4,447,343 A | | 5/1984 | May et al. | |
| 5,204,010 A | | 4/1993 | Klewsaat | |
| 2002/0147366 A1 | | 10/2002 | Wiggins et al. | |
| 2005/0164903 A1 | | 7/2005 | Ko et al. | |
| 2011/0281779 A1 | | 11/2011 | Weerasooriya et al. | |
| 2013/0277276 A1 | * | 10/2013 | Weerasooriya | E21B 43/16 |
| | | | | 208/435 |

FOREIGN PATENT DOCUMENTS

| | | | |
|---|---|---|---|
| CN | 102304067 A | | 1/2012 |
| CN | 102485771 A | | 6/2012 |
| CN | 103421174 | * | 12/2013 |
| CN | 103421480 A | | 12/2013 |
| CN | 103540303 A | | 1/2014 |
| GB | 1288021 | * | 9/1972 |
| RU | 02266300 C2 | | 12/2005 |
| SU | 01419527 A3 | | 8/1988 |
| WO | 2011/110502 A1 | | 9/2011 |
| WO | 2011/130310 A1 | | 10/2011 |

OTHER PUBLICATIONS

Gong, Yu-jun and Xue, Yuan-ying, "The solubilization of the catanionic surfactants mixture," Journal of Northwest University (Natural Science Edition), Feb. 2000, vol. 30, No. 1, pp. 28-31.
Huang, H., et al., "Synergistic effect of oil-displacing surfactant with non-iconic surfactant and cationic surfactant," Journal of Oil and Gas Technology, Aug. 2007, vol. 29, No. 4, pp. 101-104.
International Search Report, Written Opinion and Translation of the ISR for PCT/CN2014/000762, dated May 11, 2015.
https://www.molinstincts.com/chemical-structure/Sodium-trideceth-7-carboxylate-cstr-CT . . . downloaded on Jul. 25, 2018.

* cited by examiner

*Primary Examiner* — Kumar R Bhushan
(74) *Attorney, Agent, or Firm* — Novick, Kim & Lee, PLLC; Allen Xue

(57) ABSTRACT

This invention relates to a surfactant composition, production and use thereof in tertiary oil recovery. The present surfactant composition comprises a cationic-nonionic surfactant and an anionic surfactant, and exhibits significantly improved interfacial activity and stability as compared with the prior art. With the present surfactant composition, a flooding fluid composition for tertiary oil recovery with improved oil displacement efficiency and oil washing capability as compared with the prior art could be produced.

11 Claims, No Drawings

SURFACTANT COMPOSITION AND PREPARATION METHOD THEREFOR AND APPLICATION THEREOF

TECHNICAL FIELD

This invention relates to a surfactant composition. Specifically, this invention relates to a surfactant composition for tertiary oil recovery, production and use thereof in tertiary oil recovery.

BACKGROUND ART

With the increase in world energy demand, rational development and utilization of crude oil has caused more and more attention, the demand on crude oil output and recovery efficiency is also getting higher and higher. The conventional (primary or secondary) crude oil recovery process generally recovered only ⅓ of the geological crude oil reserves, with about ⅔ thereof failing to be extracted. Therefore, with the increasing tense in energy consumption, enhanced oil recovery has become an important topic in the research of crude oil recovery.

The tertiary oil recovery technology is an effective process for enhanced oil recovery. Specifically, among tertiary oil recovery technologies, the chemical enhanced oil recovery (CEOR) technology represents a very important and large-scale implemented technology, including the polymer flooding technology, the surfactant flooding technology, the alkali water flooding technology and a combination thereof. The CEOR technology makes use of the combination of physical and chemical effects, wherein the chemical action mainly resides in reducing the interfacial tension between a flooding fluid and crude oil. A surfactant contains both lipophilic (hydrophobic) and hydrophilic (lipophobic) segments, when dissolved into water, mainly adsorbed at the oil-water interface, whereby significantly reducing the oil-water interfacial tension (IFT). The reduction in the oil-water interfacial tension indicates that the surfactant is capable of reduction the cohesive force inside crude oil, dividing larger oil droplets into smaller ones, whereby increasing the passing rate of crude oil through a pore throat. The flooding function observed with a surfactant is further indicated by the effects like alteration in the surface wettability of oleophylic rock, emulsification of crude oil, increment of the surface charge density and oil droplet coalescence, all of which explain why the surfactant has been identified as a critical component in a flooding fluid.

However, the prior art flooding fluid for tertiary oil recovery suffers from such problems as poor interfacial activity of the surfactant component, leading to a relatively lower oil displacement efficiency for the flooding fluid produced therefrom, an over-complicated composition with the flooding fluid, which makes difficult the demulsification of the recovered liquid and the treatment of produced water; necessarily containing an inorganic alkali, which is harmful to the reservoir and oil wells, leading to corrosion of equipments and pipings. Further, an inorganic alkali will significantly decrease the viscosity of a polymer component, then a relatively higher amount of polymer has to be used to achieve a predetermined level of viscosity, which increases the overall cost of oil recovery. The prior art surfactant component is insufficient in the tolerance to elevated temperatures, and the tolerance to high salinity and high total dissolved salt (TDS), and tends to generate precipitation during compounding due to its poor stability.

Therefore, there is still a need for a surfactant composition, which is deprived of the problems in association with the prior art, and shows improved interfacial activity and stability as compared with the prior art.

INVENTION SUMMARY

The present inventors, on the basis of the prior art, found a novel surfactant composition, and further found that, when a flooding fluid composition for tertiary oil recovery (i.e. a flooding fluid) is produced with this surfactant composition, the aforesaid problems in association with the prior art can be solved, and then this invention is achieved.

Specifically, this invention relates to the following aspects.

A surfactant composition, which is characterized by comprising a cationic-nonionic surfactant and an anionic surfactant, wherein the ratio by molar of the cationic-nonionic surfactant and the anionic surfactant is 1:0.01-100 (preferably 1:0.1-10), the anionic surfactant is one or more compound represented by the following formula (I), and the cationic-nonionic surfactant is one or more compound represented by the following formula (II),

(I)

in the formula (I), the group

represents an optionally substituted x valent $C_{8-50}$ (preferably $C_{8-20}$) linear or branched alkyl, an optionally substituted x valent $C_{5-50}$ (preferably $C_{5-10}$ or $C_{5-8}$) monocyclic or polycyclic cycloalkyl (preferably $C_{5-7}$ monocyclic cycloalkyl, for example, cyclohexyl), an optionally substituted x valent $C_{8-50}$ (preferably $C_{8-20}$) linear or branched alkenyl, an optionally substituted x valent $C_{6-50}$ (preferably $C_{6-20}$) aryl or an optionally substituted x valent $C_{8-50}$ (preferably $C_{8-20}$) linear or branched heteroalkyl; plural group Poly may be identical to or different from one another, each independently represents a single bond or a group represented by the formula

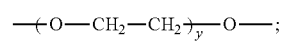

plural group L may be identical to or different from one another, each independently selected from the group consisting of an optionally substituted $C_{1-10}$ linear or branched alkylene and an optionally substituted $C_{2-10}$ linear or branched alkenylene (preferably each independently represents an optionally substituted $C_{1-5}$ linear or branched alkylene); plural group Salt may be identical to or different from one another, each independently represents a group represented by the formula $-A^-(M)_r^+$, wherein the group $A^-$ represents a carboxylate ion ($COO^-$) or a sulfonate ion ($SO_3^-$); the numerical value x represents an integer of from 1 to 10 (preferably an integer from 1 to 4, for example, 1 or 2); among plural group Poly, plural numerical value y may be identical to or different from one another, each independently represents a value of from 0 to 100 (preferably a value of from 0 to 50), with the proviso that the sum of all (i.e. x in total) numerical values y is greater than 0 and not greater than 100 (preferably greater than 0 but not greater than 50); the group M represents alkali metal (preferably Li, Na or K), alkaline earth metal (preferably Mg or Ca) or ammonium ($NH_4$); when the group M represents alkali metal or ammonium, r=1; when the group M represents alkaline earth metal, r=0.5, by "optionally substituted", it refers to optionally substituted by one or more substituent selected from the group consisting of oxo, hydroxyl, a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl,

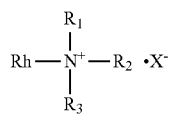  (II)

in the formula (II), the group $N^+$ represents a quaternary nitrogen cation, the groups $R_1$ to $R_3$ may be identical to or different from one another, each independently selected from the group consisting of an optionally substituted $C_{1-50}$ (preferably $C_{1-20}$) linear or branched alkyl, an optionally substituted $C_{5-50}$ (preferably $C_{5-10}$ or $C_{5-8}$) monocyclic or polycyclic cycloalkyl (preferably $C_{5-7}$ monocyclic cycloalkyl, for example, cyclohexyl), an optionally substituted $C_{2-50}$ (preferably $C_{2-20}$) linear or branched alkenyl, an optionally substituted $C_{6-50}$ (preferably $C_{6-20}$) aryl and a group represented by the formula

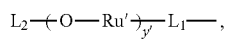, with the proviso that at least one out of the groups $R_1$ to $R_3$ represents the group represented by the formula

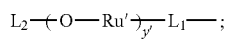;

the group Rh represents an optionally substituted $C_{1-50}$ (preferably $C_{1-20}$) linear or branched alkyl, an optionally substituted $C_{5-50}$ (preferably $C_{5-10}$ or $C_{5-8}$) monocyclic or polycyclic cycloalkyl (for example, cyclohexyl), an optionally substituted $C_{2-50}$ (preferably $C_{2-20}$) linear or branched alkenyl or an optionally substituted $C_{6-50}$ (preferably $C_{6-20}$) aryl; the group $L_1$ represents a single bond, a $C_{1-10}$ linear or branched alkylene oxy, a $C_{2-10}$ linear or branched alkenylene oxy or a $C_{6-10}$ arylene oxy (preferably a single bond or a $C_{1-5}$ linear or branched alkylene oxy); the numerical value y' represents a value of from 0 to 200 (preferably a value of from 0 to 100), excluding 0; plural group Ru' may be identical to or different from one another, each independently represents a $C_{2-6}$ linear or branched alkylene (preferably each independently represents —$CH_2$—$CH_2$— or —$CH_2$—$CH(CH_3)$—); the group $L_2$ represents hydrogen, an optionally substituted $C_{1-50}$ (preferably $C_{1-10}$) linear or branched alkyl, an optionally substituted $C_{5-50}$ (preferably $C_{5-10}$ or $C_{5-8}$) monocyclic or polycyclic cycloalkyl (preferably $C_{5-7}$ monocyclic cycloalkyl, for example, cyclohexyl), an optionally substituted $C_{2-50}$ (preferably $C_{2-10}$) linear or branched alkenyl or an optionally substituted $C_{6-50}$ (preferably $C_{6-10}$) aryl; the group $X^-$ represents a halogen ion (preferably fluoride ion, chloride ion, bromide ion or iodide ion, more preferably chloride ion) or hydroxide ion ($OH^-$), by "optionally substituted", it refers to optionally substituted by one or more substituent selected from the group consisting of a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl, wherein the linear or branched heteroalkyl represents a group obtained by directly replacing one or more group —$CH_2$— locating inside the molecular structure of a linear or branched alkyl by a corresponding number of replacing group selected from —O—, —S— or —NR'— (wherein the group R' represents an optionally substituted $C_{1-20}$ (preferably $C_{1-10}$) linear or branched alkyl, an optionally substituted $C_{5-10}$ (preferably $C_{5-8}$ or $C_{5-7}$) monocyclic or polycyclic cycloalkyl, an optionally substituted $C_{2-20}$ (preferably $C_{2-10}$) linear or branched alkenyl or an optionally substituted $C_{6-20}$ (preferably $C_{6-10}$) aryl), or a group obtained by directly replacing one or more group

locating inside the molecular structure of a linear or branched alkyl by a corresponding number of replacing group

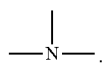.

The surfactant composition according to Aspect 1, wherein the group

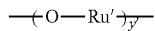

is an ether segment represented by the formula

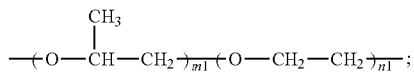;

the numerical value m1 represents a value of from 0 to 100, preferably a value of from 0 to 50; the numerical value n1 represents a value of from 0 to 100, preferably a value of from 0 to 50, with the proviso that the sum of the numerical value m1 and the numerical value n1 is greater than 0 and not greater than 200 (preferably not greater than 100); preferably, the ether segment bonds to the group $L_2$ and the group $L_1$ in a manner represented by the following formula,

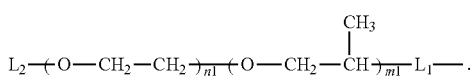

A surfactant composition, produced by mixing a cationic-nonionic surfactant and an anionic surfactant, wherein the ratio by molar of the cationic-nonionic surfactant and the anionic surfactant is 1:0.01-100 (preferably 1:0.1-10), the anionic surfactant is one or more compound represented by the following formula (I), and the cationic-nonionic surfactant is one or more compound represented by the following formula (II),

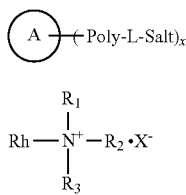

in the formula (I) and the formula (II), the groups and the numerical values are as defined in Aspect 1.

A process for producing a surfactant composition, which is characterized by including a step of mixing a cationic-nonionic surfactant and an anionic surfactant, wherein the ratio by molar of the cationic-nonionic surfactant and the anionic surfactant is 1:0.01-100 (preferably 1:0.1-10), the anionic surfactant is one or more compound represented by the following formula (I), and the cationic-nonionic surfactant is one or more compound represented by the following formula (II),

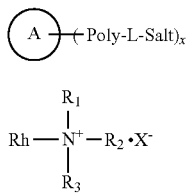

in the formula (I) and the formula (II), the groups and the numerical values are as defined in Aspect 1.

A flooding fluid composition for tertiary oil recovery, which is characterized by comprising the surfactant composition according to any of the preceding aspects or the surfactant composition produced in line with the process according to any of the preceding aspects, and water, wherein the surfactant composition accounts for 0.001-10 wt %, preferably 0.005-5 wt %, more preferably 0.02-1 wt %, further preferably 0.02-0.5 wt %, more preferably 0.02-0.35 wt %, relative to the total weight of the flooding fluid composition for tertiary oil recovery (as 100 wt %).

The flooding fluid composition for tertiary oil recovery according to any of the preceding aspects, comprising no inorganic alkali.

A process for producing a flooding fluid composition for tertiary oil recovery, which is characterized by mixing the surfactant composition according to any of the preceding aspects or the surfactant composition produced in line with the process according to any of the preceding aspects, at least with water, wherein the surfactant composition accounts for 0.001-10 wt %, preferably 0.005-5 wt %, more preferably 0.02-1 wt %, further preferably 0.02-0.5 wt %, more preferably 0.02-0.35 wt %, relative to the total weight of the flooding fluid composition for tertiary oil recovery (as 100 wt %).

A tertiary oil recovery process, which is characterized by including a step of conducting tertiary oil recovery in the presence of the surfactant composition according to any of the preceding aspects, the surfactant composition produced in line with the process according to any of the preceding aspects, the flooding fluid composition for tertiary oil recovery according to any of the preceding aspects, or the flooding fluid composition for tertiary oil recovery produced in line with the process according to any of the preceding aspects, as a flooding fluid.

The tertiary oil recovery process according to any of the preceding aspects, wherein no inorganic alkali is used.

TECHNICAL EFFECTS

The surfactant composition according to this invention exhibits, as compared with the prior art, significantly improved interfacial activity and stability. For example, at a concentration of as low as 0.01 to 0.05 wt %, the present surfactant composition can still provide a significantly ultra low interfacial tension of $10^{-3}$-$10^{-4}$ mN/m with crude oil.

The flooding fluid composition for tertiary oil recovery according to this invention, which contains the surfactant composition of this invention as the surfactant component, exhibits as compared with the prior art improved oil displacement efficiency and oil washing capability (for example, with an oil washing rate of more than 40% for crude oil), and is capable of significantly enhancing oil recovery.

The flooding fluid composition for tertiary oil recovery according to this invention is characterized by a simplified system, containing no inorganic alkali, no harm to the reservoir and oil wells, not corrosive to equipments and pipings, and not leading to difficult demulsification.

SPECIFIC MODE TO CARRY OUT THIS INVENTION

This invention will be described in details hereinafter with reference to the following specific embodiments. However, it should be noted that the protection scope of this invention should not be construed as limited to these specific embodiments, but rather determined by the attached claims.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention.

Further, to the extent that any meaning or definition of a term in this document conflicts with any meaning or definition of the same term in a document incorporated by reference, the meaning or definition assigned to that term in this document shall govern.

In the context of this specification, the term "halo" or the like refers to fluoro, chloro, bromo or iodo.

In the context of this specification, by "linear or branched heteroalkyl", it refers to a group obtained by directly replacing one or more (for example, from 1 to 4, from 1 to 3, from 1 to 2, or 1) group —CH$_2$— locating inside the molecular structure (not including that at the terminal of the main chain or any side chain in the molecular structure) of a linear or branched alkyl by a corresponding number of replacing group selected from —O—, —S— or —NR'—, or a group obtained by directly replacing one or more (for example, from 1 to 3, from 1 to 2, or 1) group

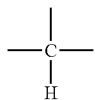

locating inside the molecular structure (not including that at the terminal of the main chain or any side chain in the molecular structure) of a linear or branched alkyl by a corresponding number of replacing group

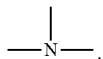

As the replacing group, it is preferably —NR'— or

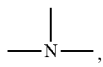

more preferably —NR'—. Herein, the group R' represents an optionally substituted C$_{1-20}$ linear or branched alkyl, an optionally substituted C$_{5-10}$ monocyclic or polycyclic cycloalkyl, an optionally substituted C$_{2-20}$ linear or branched alkenyl or an optionally substituted C$_{6-20}$ aryl. As the C$_{1-20}$ linear or branched alkyl, for example, there may be exemplified a C$_{1-10}$ linear or branched alkyl or a C$_{1-6}$ linear or branched alkyl, specifically methyl or ethyl, and so on. As the C$_{5-10}$ monocyclic or polycyclic cycloalkyl, for example, there may be exemplified a C$_{5-8}$ monocyclic or polycyclic cycloalkyl or a C$_{5-7}$ monocyclic or polycyclic cycloalkyl, especially a C$_{5-7}$ monocyclic cycloalkyl, specifically cyclopentyl or cyclohexyl. As the C$_{2-20}$ linear or branched alkenyl, for example, there may be exemplified a C$_{2-10}$ linear or branched alkenyl, specifically vinyl, propenyl or allyl, and so on. As the C$_{6-20}$ aryl, for example, there may be exemplified a C$_{6-10}$ aryl, specifically phenyl or naphthyl. As the group R', it is preferably a C$_{1-20}$ linear or branched alkyl or a C$_{5-7}$ monocyclic cycloalkyl, specifically methyl, ethyl or cyclohexyl. Herein, by optionally substituted, it refers to optionally substituted by one or more (for example, from 1 to 4, from 1 to 3, from 1 to 2 or 1) substituent selected from the group consisting of hydroxyl, a C$_{1-20}$ linear or branched alkyl, a C$_{5-10}$ monocyclic or polycyclic cycloalkyl, a C$_{2-20}$ linear or branched alkenyl and a C$_{6-20}$ aryl. As the C$_{1-20}$ linear or branched alkyl, for example, there may be exemplified a C$_{5-15}$ linear or branched alkyl or a C$_{5-10}$ linear or branched alkyl, or methyl or ethyl, and so on. As the C$_{5-10}$ monocyclic or polycyclic cycloalkyl, for example, there may be exemplified a C$_{5-8}$ monocyclic or polycyclic cycloalkyl or a C$_{5-7}$ monocyclic or polycyclic cycloalkyl, especially a C$_{5-7}$ monocyclic cycloalkyl, specifically cyclopentyl or cyclohexyl. As the C$_{2-20}$ linear or branched alkenyl, for example, there may be exemplified a C$_{2-10}$ linear or branched alkenyl, specifically vinyl, propenyl or allyl, and so on. As the C$_{6-20}$ aryl, for example, there may be exemplified a C$_{6-10}$ aryl, specifically phenyl or naphthyl. It is obvious that, from the standpoint of structure stability, when plural exist, these replacing groups do not directly bond to one another. Further, the carbon atom number of the linear or branched alkyl is reduced accordingly due to the replacement of the group —CH$_2$— or

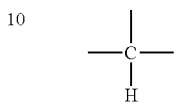

by the replacing group, however, to simplify the description, the carbon atom number of the linear or branched alkyl before the replacement is still used to refer to the carbon atom number of the resultant linear or branched heteroalkyl. As the linear or branched heteroalkyl, if specifically exemplified, a C$_4$ linear alkyl, for example,

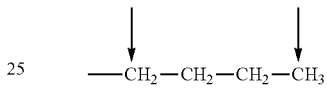

(In this formula, the groups indicated by the arrow marks do not locate inside the molecular structure of the linear alkyl, but rather at the terminal of the main chain) if directly replaced by one replacing group —O—, —CH$_2$—O—CH$_2$—CH$_3$ or —CH$_2$—CH$_2$—O—CH$_3$ will be obtained, called as C$_4$ linear heteroalkyl. Or, a C$_4$ branched alkyl, for example,

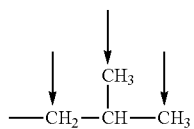

(In this formula, the groups indicated by the arrow marks do not locate inside the molecular structure of the branched alkyl, but rather at the terminal of the main chain and that of the side chain) if directly replaced by one replacing group —N<,

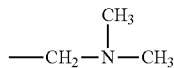

will be obtained, called as C$_4$ branched heteroalkyl. According to this invention, as the linear or branched heteroalkyl, there may be exemplified a C$_{3-50}$ linear or branched heteroalkyl, specifically a C$_{8-50}$ linear or branched heteroalkyl, a C$_{8-30}$ linear or branched heteroalkyl or a C$_{8-20}$ linear or branched heteroalkyl.

In the context of this specification, if a group is defined or described in the form of "numerical value+valent+group" or the like, it refers to a group obtained by removing a number of hydrogen atom (wherein the number of the hydrogen atom corresponds to the numerical value) from the corresponding basic structure (for example, a chain, a ring or a combination thereof) of the group, preferably refers to a group obtained by removing a number of hydrogen atom (wherein the number of the hydrogen atom corresponds to the numerical value) from a carbon atom (preferably from a saturated carbon atom and/or if the numerical value is two or more, from different carbon atoms) contained in the basic structure. For example, "3 valent linear or branched alkyl" refers to a group obtained by removing 3 (three) hydrogen atoms from a linear or branched alkane (i.e. the corresponding basic structure (chain) of the linear or branched alkyl), while "2 valent linear or branched heteroalkyl" refers to a group obtained by removing 2 (two) hydrogen atoms from a linear or branched heteroalkane (preferably from a carbon atom of the heteroalkane, or further, from two different carbon atoms in the heteroalkane). Obviously, the expression "0 valent+group" represents the basic structure itself, for example, a 0 valent alkyl corresponds to an alkane.

Unless otherwise specified, percents, parts or ratios or the like mentioned in this specification are all on a weight basis.

According to this invention, related to is a surfactant composition, which comprises a cationic-nonionic surfactant and an anionic surfactant.

According to this invention, in the surfactant composition, the ratio by molar of the cationic-nonionic surfactant and the anionic surfactant could be generally 1:0.01-100, preferably 1:0.1-10.

According to this invention, the anionic surfactant is a compound represented by the following formula (I). As the compound, one kind or a mixture of two or more kinds at any ratio therebetween could be used.

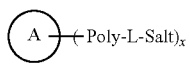     (I)

According to this invention, in the formula (I), the group

represents an optionally substituted x valent $C_{8-50}$ linear or branched alkyl, an optionally substituted x valent $C_{5-50}$ monocyclic or polycyclic cycloalkyl, an optionally substituted x valent $C_{8-50}$ linear or branched alkenyl, an optionally substituted x valent $C_{6-50}$ aryl or an optionally substituted x valent $C_{8-50}$ linear or branched heteroalkyl. As the optionally substituted x valent $C_{8-50}$ linear or branched alkyl, it is preferably an optionally substituted x valent $C_{8-20}$ linear or branched alkyl. As the optionally substituted x valent $C_{5-50}$ monocyclic or polycyclic cycloalkyl, for example, there may be exemplified an optionally substituted x valent $C_{5-10}$ monocyclic or polycyclic cycloalkyl, an optionally substituted x valent $C_{5-8}$ monocyclic or polycyclic cycloalkyl or an optionally substituted x valent $C_{5-7}$ monocyclic or polycyclic cycloalkyl, especially an optionally substituted x valent $C_{5-7}$ monocyclic cycloalkyl, for example, cyclohexyl. The optionally substituted x valent $C_{8-50}$ linear or branched alkenyl is preferably an optionally substituted x valent $C_{8-20}$ linear or branched alkenyl. The optionally substituted x valent $C_{6-50}$ aryl is preferably an optionally substituted x valent $C_{6-20}$ aryl, for example, phenyl or naphthyl. The optionally substituted x valent $C_{8-50}$ linear or branched heteroalkyl is preferably an optionally substituted x valent $C_{8-20}$ linear or branched heteroalkyl.

According to this invention, in the formula (I), plural group Poly may be identical to or different from one another, each independently represents a single bond or a group represented by the formula

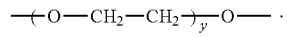

According to an embodiment of this invention, in the formula (I), the group Poly represents a group represented by the formula

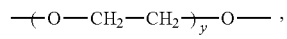

wherein the numerical value y represents a value of from 0 to 100, preferably a value of from 0 to 50; or when plural group Poly exists, among plural group Poly, plural numerical value y may be identical to or different from one another, each independently represents a value of from 0 to 100, preferably a value of from 0 to 50. Herein, the numerical value y represents an average number of the unit —O—$CH_2$—$CH_2$— in the group represented by the formula

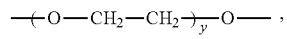

and thus could be a non-integer or an integer. As the numerical value y, for example, there may be exemplified 0, 2.0, 3.0, 3.5, 7.5, 10.0, 15.0, 25.0, 30.2, 35.0, 40.0, 45.5 or 50.5, and so on.

According to the embodiment of this invention, in the formula (I), it is required that the sum of all (i.e. x in total) numerical values y (i.e. throughout the molecular structure of the compound represented by the formula (I), the overall average number of the unit —O—$CH_2$—$CH_2$—) is greater than 0 and not greater than 100, preferably the sum of all (i.e. x in total) numerical values y is greater than 0 but not greater than 50. In this context, according to the embodiment of this invention, throughout the molecular structure of the compound represented by the formula (I), it is necessary to contain (a certain amount of) the unit —O—$CH_2$—$CH_2$—. Herein, throughout the molecular structure of the compound represented by the formula (I), as the overall average number of the unit —O—$CH_2$—$CH_2$—, for example, there may be exemplified 0.1, 0.5, 1.5, 2.0, 3.0, 3.5, 7.5, 10.0, 15.0, 25.0, 30.2, 35.0, 40.0, 45.5 or 50.5, and so on.

According to this invention, in the formula (I), plural group L may be identical to or different from one another, each independently selected from the group consisting of an optionally substituted $C_{1-10}$ linear or branched alkylene and an optionally substituted $C_{2-10}$ linear or branched alkenylene, preferably each independently represents an optionally substituted $C_{1-5}$ linear or branched alkylene.

According to this invention, in the formula (I), plural group Salt may be identical to or different from one another, each independently represents a group represented by the formula $-A^-(M)_r^-$, wherein the group $A^-$ represents a carboxylate ion ($COO^-$) or a sulfonate ion ($SO_3^-$), the group M represents alkali metal (preferably Li, Na or K), alkaline earth metal (preferably Mg or Ca) or ammonium ($NH_4$); when the group M represents alkali metal or ammonium, r=1; when the group M represents alkaline earth metal, r=0.5.

According to an embodiment of this invention, in the formula (I), depending on the total number of the group Salt, the total number of the group A⁻ could be one or x, with the proviso that at least one out of the group A⁻ represents the carboxylate ion (COO⁻). In this context, throughout the molecular structure of the compound represented by the formula (I), it is preferable to exist at least one carboxylate ion (COO⁻).

According to this invention, in the formula (I), the numerical value x represents the valency of the group

, which is an integer of from 1 to 10, preferably an integer from 1 to 4, for example, 1 or 2.

According to this invention, in the formula (I), unless otherwise specified, by optionally substituted, it refers to optionally substituted by one or more (for example, from 1 to 5, from 1 to 4, from 1 to 3, from 1 to 2 or 1) substituent selected from the group consisting of oxo (i.e. ), hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

According to this invention, in the formula (I), when oxo exists as the substituent, it is preferred that at least one oxo exists on the carbon atom directly bonding to a N atom (if any, for example, that contained in a linear or branched heteroalkyl), so as to make the carbon atom to present in the form of carbonyl (i.e. 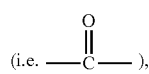), whereby introducing a structure of carbonyl directly bonding to a N atom (for example, imido) into the molecular structure of the compound represented by the formula (I). Further, to provide better hydrolysis resistance or chemical resistance, it is preferred that there is no oxo as the substituent on at least a part (preferably all) of the carbon atoms directly bonding to an O or S atom (if any), and/or, on at least a part (preferably all) of the terminal carbon atoms (i.e. the carbon atom at a free end of and/or a un-bonded position on the molecular chain), and/or, two carbon atoms directly bonding to each other are not substituted by oxo simultaneously. By doing so, no chemically active or unstable group like an ester or aldehyde group will be introduced into the molecular structure of the compound represented by the formula (I). Specifically, assuming that the group

represents a 1 valent linear alkyl

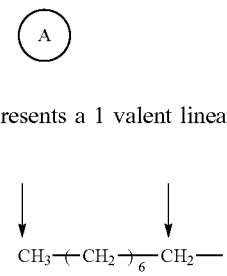

(comprising two terminal carbon atoms as indicated by the arrow marks in the formula) substituted by one oxo, according to the aforesaid principles, this group is preferably

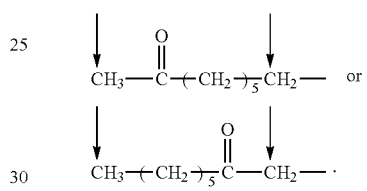

Or, assuming that the group

is a 1 valent branched heteroalkyl

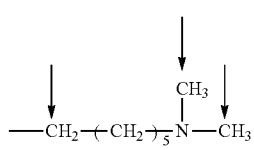

(comprising three terminal carbon atoms as indicated by the arrow marks in the formula, also comprising three carbon atoms directly bonding to a N atom) substituted by one oxo, according to the aforesaid principles, this group is preferably

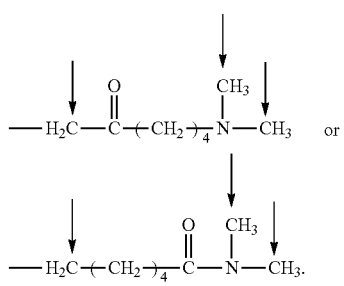

According to an embodiment of this invention, the anionic surfactant is a compound represented by the following formula (I-1), a compound represented by the following formula (I-2), a compound represented by the following formula (I-3) or a compound represented by the following formula (I-4). As these compounds, one kind or a mixture of two or more kinds at any ratio therebetween could be used.

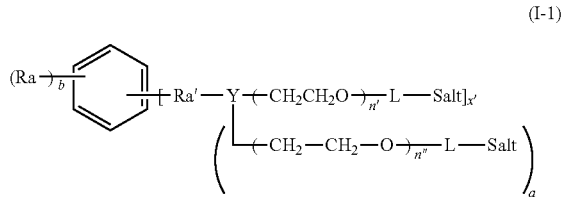

(I-1)

According to this invention, in the formula (I-1), plural group Ra may be identical to or different from one another, each independently selected from the group consisting of an optionally substituted $C_{1-20}$ linear or branched alkyl, an optionally substituted $C_{2-20}$ linear or branched alkenyl and an optionally substituted $C_{6-10}$ aryl, preferably an optionally substituted $C_{5-15}$ linear or branched alkyl and an optionally substituted $C_{6-10}$ aryl.

According to this invention, in the formula (I-1), plural group Ra' may be identical to or different from one another, each independently selected from the group consisting of a single bond, an optionally substituted $C_{1-10}$ linear or branched alkylene, an optionally substituted $C_{2-10}$ linear or branched alkenylene, carbonyl, an optionally substituted $C_{1-10}$ linear or branched alkylene carbonyl and an optionally substituted $C_{2-10}$ linear or branched alkenylene carbonyl, preferably each independently selected from the group consisting of a single bond and an optionally substituted $C_{1-6}$ linear or branched alkylene.

According to this invention, in the formula (I-1), the numerical value b represents an integer of from 0 to 3, preferably 1.

According to this invention, in the formula (I-1), the numerical value x' represents the number of the group

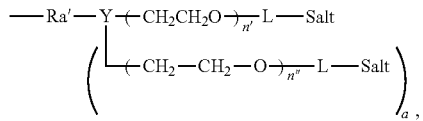

which is an integer from 1 to 6, preferably an integer from 1 to 4, for example, 2, 3 or 4. Obviously, b+x'≤6.

According to this invention, in the formula (I-1), plural group Y may be identical to or different from one another, each independently selected from the group consisting of N and O, with the proviso that when the group Y represents N, a=1, when the group Y represents O, a=0.

According to this invention, in the formula (I-1), plural numerical value n' may be identical to or different from one another, each independently represents a value of from 0 to 100, preferably a value of from 0 to 50. Herein, the numerical value n' represents an average number of the unit —$CH_2$—$CH_2$—O—, and thus could be a non-integer or an integer. As the numerical value n', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-1), plural numerical value n" may be identical to or different from one another, each independently represents a value of from 0 to 100, preferably a value of from 0 to 50. Herein, the numerical value n" represents an average number of the unit —$CH_2$—$CH_2$—O—, and thus could be a non-integer or an integer. As the numerical value n", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-1), it is required that the sum of all (i.e. corresponding to x') numerical value n' and all (i.e. corresponding to x'×a) numerical value n" (i.e. throughout the molecular structure of the compound represented by the formula (I-1), the overall average number of the unit —$CH_2$—$CH_2$—O—) is not greater than 100, preferably not greater than 50. As the overall average number of the unit —$CH_2$—$CH_2$—O—, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to an embodiment of this invention, preferably, in the formula (I-1), the sum of all (i.e. corresponding to x') numerical value n' and all (i.e. corresponding to x'×a) numerical values n" (i.e. throughout the molecular structure of the compound represented by the formula (I-1), the overall average number of the unit —$CH_2$—$CH_2$—O—) is greater than 0. In this context, throughout the molecular structure of the compound represented by the formula (I-1), it is preferred to contain (a certain amount of) the unit —$CH_2$—$CH_2$—O—. Herein, throughout the molecular structure of the compound represented by the formula (I-1), as the overall average number of the unit —$CH_2$—$CH_2$—O—, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-1), plural group L may be identical to or different from one another, each independently selected from the group consisting of an optionally substituted $C_{1-10}$ linear or branched alkylene and an optionally substituted $C_{2-10}$ linear or branched alkenylene, preferably each independently represents an optionally substituted $C_{1-5}$ linear or branched alkylene.

According to this invention, in the formula (I-1), plural group Salt may be identical to or different from one another, each independently represents a group represented by the formula -$A^-(M)_r^+$, wherein the group $A^-$ represents a carboxylate ion ($COO^-$) or a sulfonate ion ($SO_3^-$), the group M represents alkali metal (preferably Li, Na or K), alkaline earth metal (preferably Mg or Ca) or ammonium ($NH_4$). When the group M represents alkali metal or ammonium, r=1; when the group M represents alkaline earth metal, r=0.5.

According to an embodiment of this invention, in the formula (I-1), depending on the total number of the group Salt, the group $A^-$ could be one or more in number, wherein at least one out of the group $A^-$ represents the carboxylate ion ($COO^-$). In this context, throughout the molecular structure of the compound represented by the formula (I-1), it is preferable to exist at least one carboxylate ion ($COO^-$).

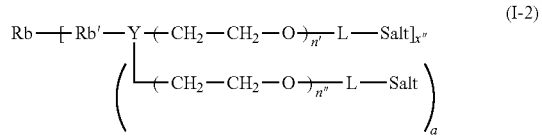

(I-2)

According to this invention, in the formula (I-2), the group Rb represents an optionally substituted $C_{1-50}$ linear or branched alkyl, an optionally substituted $C_{5-50}$ monocyclic or polycyclic cycloalkyl or an optionally substituted $C_{2-50}$ linear or branched alkenyl, preferably an optionally substituted $C_{1-29}$ linear or branched alkyl, an optionally substituted $C_{5-10}$ monocyclic or polycyclic cycloalkyl or an optionally substituted $C_{2-29}$ linear or branched alkenyl, more preferably an optionally substituted $C_{5-20}$ linear or branched alkyl, an optionally substituted $C_{5-8}$ monocyclic or polycyclic cycloalkyl or an optionally substituted $C_{5-20}$ linear or branched alkenyl, more preferably an optionally substituted $C_{8-20}$ linear or branched alkyl, an optionally substituted $C_{5-7}$ monocyclic cycloalkyl (for example, cyclohexyl) or an optionally substituted $C_{8-20}$ linear or branched alkenyl.

According to this invention, in the formula (I-2), plural group Rb' may be identical to or different from one another, each independently selected from the group consisting of a single bond and carbonyl.

According to this invention, in the formula (I-2), plural group Y may be identical to or different from one another, each independently selected from the group consisting of N and O, with the proviso that when the group Y represents N, a=1, when the group Y represents O, a=0.

According to this invention, in the formula (I-2), the numerical value x" represents the number of the group

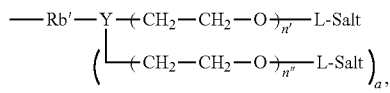

which is an integer of from 1 to 10, preferably an integer from 1 to 4, for example, 2, 3 or 4.

According to this invention, in the formula (I-2), plural numerical value n' may be identical to or different from one another, each independently represents a value of from 0 to 100, preferably a value of from 0 to 50. Herein, the numerical value n' represents an average number of the unit —$CH_2$—$CH_2$—O—, and thus could be a non-integer or an integer. As the numerical value n', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-2), plural numerical value n" may be identical to or different from one another, each independently represents a value of from 0 to 100, preferably a value of from 0 to 50. Herein, the numerical value n" represents an average number of the unit —$CH_2$—$CH_O$—, and thus could be a non-integer or an integer. As the numerical value n", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-2), it is required that the sum of all (i.e. corresponding to x") numerical value n' and all (i.e. corresponding to x"xa) numerical value n" (i.e. throughout the molecular structure of the compound represented by the formula (I-2), the overall average number of the unit —$CH_2$—$CH_2$—O—) is not greater than 100, preferably not greater than 50. As the overall average number of the unit —$CH_2$—$CH_2$—O—, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to an embodiment of this invention, preferably, in the formula (I-2), the sum of all (i.e. corresponding to x") numerical value n' and all (i.e. corresponding to x"xa) numerical values n" (i.e. throughout the molecular structure of the compound represented by the formula (I-2), the overall average number of the unit —$CH_2$—$CH_2$—O—) is greater than 0. In this context, throughout the molecular structure of the compound represented by the formula (I-2), it is preferred to contain (a certain amount of) the unit —$CH_2$—$CH_2$—O—. Herein, throughout the molecular structure of the compound represented by the formula (I-2), as the overall average number of the unit —$CH_2$—$CH_2$—O—, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-2), plural group L may be identical to or different from one another, each independently selected from the group consisting of an optionally substituted $C_{1-10}$ linear or branched alkylene and an optionally substituted $C_{2-10}$ linear or branched alkenylene, preferably each independently represents an optionally substituted $C_{1-5}$ linear or branched alkylene.

According to this invention, in the formula (I-2), plural group Salt may be identical to or different from one another, each independently represents a group represented by the formula -$A^-(M)_r^+$, wherein the group $A^-$ represents a carboxylate ion ($COO^-$) or a sulfonate ion ($SO_3^-$), the group M represents alkali metal (preferably Li, Na or K), alkaline earth metal (preferably Mg or Ca) or ammonium ($NH_4$). When the group M represents alkali metal or ammonium, r=1; when the group M represents alkaline earth metal, r=0.5.

According to an embodiment of this invention, in the formula (I-2), depending on the total number of the group Salt, the group $A^-$ could be one or more in number, wherein at least one out of the group $A^-$ represents the carboxylate ion ($COO^-$). In this context, throughout the molecular structure of the compound represented by the formula (I-2), it is preferable to exist at least one carboxylate ion ($COO^-$).

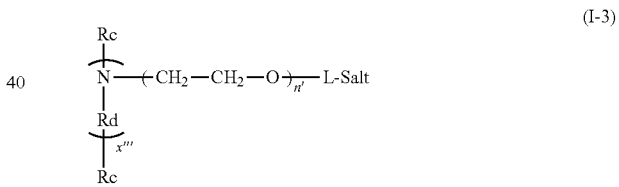
(I-3)

According to this invention, in the formula (I-3), plural group Rc may be identical to or different from one another, each independently selected from the group consisting of an optionally substituted $C_{1-20}$ linear or branched alkyl, an optionally substituted $C_{2-20}$ linear or branched alkenyl, an optionally substituted $C_{1-20}$ linear or branched alkyl carbonyl and an optionally substituted $C_{2-20}$ linear or branched alkenyl carbonyl, preferably each independently selected from the group consisting of an optionally substituted $C_{5-20}$ linear or branched alkyl, an optionally substituted $C_{5-20}$ linear or branched alkenyl, an optionally substituted $C_{5-20}$ linear or branched alkyl carbonyl and an optionally substituted $C_{5-20}$ linear or branched alkenyl carbonyl, more preferably each independently selected from the group consisting of an optionally substituted $C_{8-20}$ linear or branched alkyl, an optionally substituted $C_{8-20}$ linear or branched alkenyl, an optionally substituted $C_{8-20}$ linear or branched alkyl carbonyl and an optionally substituted $C_{8-20}$ linear or branched alkenyl carbonyl.

According to this invention, in the formula (I-3), plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl, preferably each independently selected from the group consisting of an optionally substituted $C_{1-5}$ linear or branched alkylene and an optionally substituted $C_{1-5}$ linear or branched alkylene carbonyl.

According to this invention, in the formula (I-3), the numerical value x''' represents the number of the unit

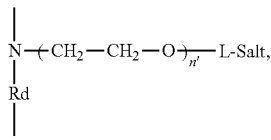

which is an integer of from 1 to 10, preferably an integer from 1 to 4, for example, 2, 3 or 4.

According to this invention, in the formula (I-3), plural numerical value n' may be identical to or different from one another, each independently represents a value of from 0 to 100, preferably a value of from 0 to 50. Herein, the numerical value n' represents an average number of the unit —$CH_2$—$CH_2$—O—, and thus could be a non-integer or an integer. As the numerical value n', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-3), it is required that the sum of all (i.e. corresponding to x''') numerical values n' (i.e. throughout the molecular structure of the compound represented by the formula (I-3), the overall average number of the unit —$CH_2$—$CH_2$—O—) is not greater than 100, preferably not greater than 50. As the overall average number of the unit —$CH_2$—$CH_2$—O—, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to an embodiment of this invention, preferably, in the formula (I-3), the sum of all (i.e. corresponding to x''') numerical values n' (i.e. throughout the molecular structure of the compound represented by the formula (I-3), the overall average number of the unit —$CH_2$—$CH_2$—O—) is greater than 0. In this context, throughout the molecular structure of the compound represented by the formula (I-3), it is preferred to contain (a certain amount of) the unit —$CH_2$—$CH_2$—O—. Herein, throughout the molecular structure of the compound represented by the formula (I-3), as the overall average number of the unit —$CH_2$—$CH_2$—O—, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-3), plural group L may be identical to or different from one another, each independently selected from the group consisting of an optionally substituted $C_{1-10}$ linear or branched alkylene and an optionally substituted $C_{2-10}$ linear or branched alkenylene, preferably each independently represents an optionally substituted $C_{1-5}$ linear or branched alkylene.

According to this invention, in the formula (I-3), plural group Salt may be identical to or different from one another, each independently represents a group represented by the formula -$A^-(M)_r^+$, wherein the group $A^-$ represents a carboxylate ion ($COO^-$) or a sulfonate ion ($SO_3^-$), the group M represents alkali metal (preferably Li, Na or K), alkaline earth metal (preferably Mg or Ca) or ammonium ($NH_4$). When the group M represents alkali metal or ammonium, r=1; when the group M represents alkaline earth metal, r=0.5.

According to an embodiment of this invention, in the formula (I-3), depending on the total number of the group Salt, the group $A^-$ could be one or more in number, wherein at least one out of the group $A^-$ represents the carboxylate ion ($COO^-$). In this context, throughout the molecular structure of the compound represented by the formula (I-3), it is preferable to exist at least one carboxylate ion ($COO^-$).

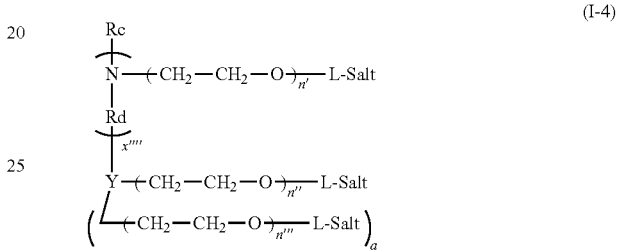

(I-4)

According to this invention, in the formula (I-4), the group Rc represents an optionally substituted $C_{1-20}$ linear or branched alkyl, an optionally substituted $C_{2-20}$ linear or branched alkenyl, an optionally substituted $C_{1-20}$ linear or branched alkyl carbonyl or an optionally substituted $C_{2-20}$ linear or branched alkenyl carbonyl, preferably an optionally substituted $C_{5-20}$ linear or branched alkyl, an optionally substituted $C_{5-20}$ linear or branched alkenyl, an optionally substituted $C_{5-20}$ linear or branched alkyl carbonyl or an optionally substituted $C_{5-20}$ linear or branched alkenyl carbonyl, more preferably an optionally substituted $C_{8-20}$ linear or branched alkyl, an optionally substituted $C_{8-20}$ linear or branched alkenyl, an optionally substituted $C_{8-20}$ linear or branched alkyl carbonyl or an optionally substituted $C_{8-20}$ linear or branched alkenyl carbonyl.

According to this invention, in the formula (I-4), plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl, preferably each independently selected from the group consisting of an optionally substituted $C_{1-5}$ linear or branched alkylene and an optionally substituted $C_{1-5}$ linear or branched alkylene carbonyl.

According to this invention, in the formula (I-4), the group Y represents N or O, with the proviso that when the group Y represents N, a=1, when the group Y represents O, a=0.

According to this invention, in the formula (I-4), the numerical value x"" represents the number of the unit

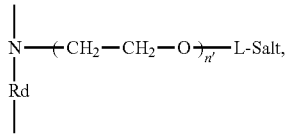

which is an integer of from 1 to 9, preferably an integer from 1 to 3, more preferably 1 or 2.

According to this invention, in the formula (I-4), plural numerical value n' may be identical to or different from one another, each independently represents a value of from 0 to 100, preferably a value of from 0 to 50. Herein, the numerical value n' represents an average number of the unit —$CH_2$—$CH_2$—O—, and thus could be a non-integer or an integer. As the numerical value n', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), plural numerical value n" may be identical to or different from one another, each independently represents a value of from 0 to 100, preferably a value of from 0 to 50. Herein, the numerical value n" represents an average number of the unit —$CH_2$—$CH_2$—O—, and thus could be a non-integer or an integer. As the numerical value n", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), plural numerical value n'" may be identical to or different from one another, each independently represents a value of from 0 to 100, preferably a value of from 0 to 50. Herein, the numerical value n'" represents an average number of the unit —$CH_2$—$CH_2$—O—, and thus could be a non-integer or an integer. As the numerical value n'", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), it is required that the sum of all (i.e. corresponding to x"") numerical values n', all (i.e. corresponding to 1) numerical values n" and all (i.e. corresponding to a) numerical values n'" (i.e. throughout the molecular structure of the compound represented by the formula (I-4), the overall average number of the unit —$CH_2$—$CH_2$—O—) is not greater than 100, preferably not greater than 50. As the overall average number of the unit —$CH_2$—$CH_2$—O—, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to an embodiment of this invention, preferably, in the formula (I-4), the sum of all (i.e. corresponding to x"") numerical values n', all (i.e. corresponding to 1) numerical values n" and all (i.e. corresponding to a) numerical values n'" (i.e. throughout the molecular structure of the compound represented by the formula (I-4), the overall average number of the unit —$CH_2$—$CH_2$—O—) is greater than 0. In this context, throughout the molecular structure of the compound represented by the formula (I-4), it is preferred to contain (a certain amount of) the unit —$CH_2$—$CH_2$—O—. Herein, throughout the molecular structure of the compound represented by the formula (I-4), as the overall average number of the unit —$CH_2$—$CH_2$—O—, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), plural group L may be identical to or different from one another, each independently selected from the group consisting of an optionally substituted $C_{1-10}$ linear or branched alkylene and an optionally substituted $C_{2-10}$ linear or branched alkenylene, preferably an optionally substituted $C_{1-5}$ linear or branched alkylene.

According to this invention, in the formula (I-4), plural group Salt may be identical to or different from one another, each independently represents a group represented by the formula -$A^-(M)_r^+$, wherein the group $A^-$ represents a carboxylate ion ($COO^-$) or a sulfonate ion ($SO_3^-$), the group M represents alkali metal (preferably Li, Na or K), alkaline earth metal (preferably Mg or Ca) or ammonium ($NH_4$). when the group M represents alkali metal or ammonium, r=1; when the group M represents alkaline earth metal, r=0.5.

According to an embodiment of this invention, in the formula (I-4), depending on the total number of the group Salt, the group $A^-$ could be one or more in number, wherein at least one out of the group $A^-$ represents the carboxylate ion ($COO^-$). In this context, throughout the molecular structure of the compound represented by the formula (I-4), it is preferable to exist at least one carboxylate ion ($COO^-$).

According to this invention, in the formula (I-1), the formula (I-2), the formula (I-3) and the formula (I-4), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

According to this invention, the anionic surfactant or the compound represented by the formula (I) may be commercially available, or could be produced in any conventional manner. For example, as the process for producing the anionic surfactant or the compound represented by the formula (I) wherein the group Poly represents a group represented by the formula

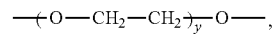

a process comprising the following Step (1) and Step (2) can be exemplified.

Step (1): reacting one or more multifunctional compound carrying one or more functional group selected from the group consisting of —OH, —$NH_2$ and —NH— with ethylene oxide in the presence of an alkaline catalyst, to obtain an ether product.

According to this invention, in Step (1), as the alkaline catalyst, any alkaline catalyst conventionally used in this field for a similar purpose may be used as such, wherein preference is given to alkali metal hydroxide, especially NaOH or KOH. As the alkaline catalyst, one kind or a mixture of two or more kinds at any ratio therebetween could be used.

According to this invention, in Step (1), as the amount of the alkaline catalyst to be used, any amount conventionally used in this field may be mentioned, but could be generally determined such that the ratio by molar of the multifunctional compound and the alkaline catalyst is 1:0.001-10, preferably 1:0.001-5.

According to this invention, in Step (1), the ratio by molar of the multifunctional compound and ethylene oxide could be generally 1:0-100, preferably 1:0-50, not including 0, more preferably 1:0.1-25.

According to this invention, in Step (1), the reaction temperature could be generally from the room temperature to 300 degrees Celsius, preferably 100-200 degrees Celsius, the reaction duration could be generally 1-20 h, preferably from 1 to 10 h, while the reaction pressure could be any pressure suitable for this reaction, for example, the normal pressure.

According to this invention, upon completion of Step (1), the thus obtained reaction product mixture could be used as such as the ether product for the succeeding Step (2), without any separation or purification thereto.

According to this invention, in Step (1), as the multifunctional compound, any compound carrying one or more (for example, from 1 to 10, preferably from 1 to 4, for example, 2, 3 or 4) functional group selected from the group consisting of —OH, —NH$_2$ and —NH— could be used, without any specific limitation thereto. The functional group has an active hydrogen, which is capable of initiating the ring open (polymerization) reaction of ethylene oxide, whereby introducing a (poly)ether segment into the molecular structure of the multifunctional compound. As the multifunctional compound, one kind or a mixture of two or more kinds at any ratio therebetween could be used. Further, the multifunctional compound may be commercially available, or could be produced in a conventional manner.

According to this invention, in Step (1), as the multifunctional compound, there is specifically exemplified a compound represented by the following formula (X). As the compound represented by the formula (X), one kind or a mixture of two or more kinds at any ratio therebetween could be used.

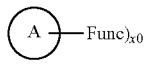 —Func)$_{x0}$ (X)

According to this invention, in the formula (X), the group

represents an optionally substituted x0 valent $C_{8-50}$ linear or branched alkyl, an optionally substituted x0 valent $C_{5-50}$ monocyclic or polycyclic cycloalkyl, an optionally substituted x0 valent $C_{8-50}$ linear or branched alkenyl, an optionally substituted x0 valent $C_{6-50}$ aryl or an optionally substituted x0 valent $C_{8-50}$ linear or branched heteroalkyl. As the optionally substituted x0 valent $C_{8-50}$ linear or branched alkyl, it is preferably an optionally substituted x0 valent $C_{8-20}$ linear or branched alkyl. As the optionally substituted x0 valent $C_{5-50}$ monocyclic or polycyclic cycloalkyl, for example, there may be exemplified an optionally substituted x0 valent $C_{5-10}$ monocyclic or polycyclic cycloalkyl, an optionally substituted x0 valent $C_{5-8}$ monocyclic or polycyclic cycloalkyl or an optionally substituted x0 valent $C_{5-7}$ monocyclic or polycyclic cycloalkyl, especially an optionally substituted x0 valent $C_{5-7}$ monocyclic cycloalkyl, for example, cyclohexyl. As the optionally substituted x0 valent $C_{8-50}$ linear or branched alkenyl, it is preferably an optionally substituted x0 valent $C_{8-20}$ linear or branched alkenyl. As the optionally substituted x0 valent $C_{6-50}$ aryl, it is preferably an optionally substituted x0 valent $C_{6-20}$ aryl, specifically phenyl or naphthyl. As the optionally substituted x0 valent $C_{8-50}$ linear or branched heteroalkyl, it is preferably an optionally substituted x0 valent $C_{8-20}$ linear or branched heteroalkyl.

According to this invention, in the formula (X), plural group Func may be identical to or different from one another, each independently selected from the group consisting of —OH, —NH— and —NH$_2$, preferably each independently selected from the group consisting of —OH and —NH$_2$.

According to this invention, in the formula (X), the numerical value x0 generally represents the valency of the group

which is an integer of from 1 to 10, preferably an integer from 1 to 4, for example, 1 or 2. However, it is reasonable to a person skilled in the art that when the group Func represents —NH—, the group

is to be interrupted by this —NH— at any (acceptable) position. Herein, the numerical value x0 (or at least a part thereof, depending on the total number of —NH—) represents how many times this interruption occurs (hereinafter referred to as interruption number), and accordingly, does not represent the valency of the group

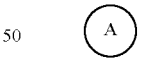

any more. In this context, the valency of the group

could be reduced to a value of as low as 0, for example, in the case that all (i.e. x0 in total) of the group Func represent —NH—. When plural —NH— exist, the group

is to be interrupted by these groups —NH— at any (acceptable) position for a corresponding number of times. By interruption, it means that the group —NH— enters inside the molecular structure of the group

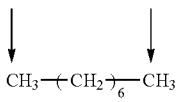

rather than locates at a terminal of the main chain or any side chain in the molecular structure thereof. It is preferred that two or more of these groups —NH— do not directly bond to one another. Specifically, assuming that the group Func is —NH—, x0 is 1 (with an interruption number of 1), while the group

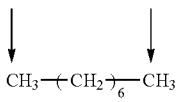

represents a $C_8$ linear alkane (i.e. a 0 valent $C_8$ linear alkyl)

$$CH_3\text{—}(CH_2)_6\text{—}CH_3$$

(the terminals of the main chain in the molecular structure being indicated by the arrow marks in the formula), the compound represented by the formula (X) could be

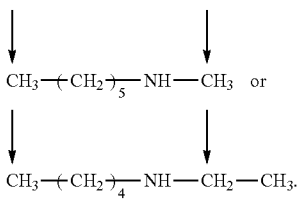

According to this invention, in the formula (X), in the definition of the group

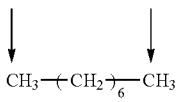

by optionally substituted, it refers to optionally substituted by one or more (for example, from 1 to 5, from 1 to 4, from 1 to 3, from 1 to 2 or 1) substituent selected from the group consisting of oxo (i.e. ), hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

According to an embodiment of this invention (referred to as Embodiment A), in the formula (X), in the definition of the group

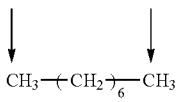, when oxo exists as the substituent, it is preferred that at least one oxo exists on the carbon atom directly bonding to a N atom (if any, for example, a N atom originated from a linear or branched heteroalkyl), so as to make the carbon atom to present in the form of carbonyl $$\text{(i.e. } -\overset{\overset{\displaystyle O}{\|}}{C}- \text{),}$$

whereby introducing a structure (for example, imido) of carbonyl directly bonding to a N atom into the molecular structure of the compound represented by the formula (X). Further, to provide better hydrolysis resistance or chemical resistance, it is preferred that there is no oxo as the substituent on at least a part (preferably all) of the carbon atoms directly bonding to an O or S atom (if any), and/or, on at least a part of (preferably all) of the terminal carbon atom (i.e. the carbon atom at a free end and/or a un-bonded position of the molecular chain) (excluding any terminal carbon atom directly bonding to the group Func in the group

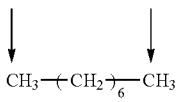

when the group Func represents —NH— or —NH$_2$, see the Embodiment B hereinafter), and/or, two carbon atoms directly bonding to each other are not substituted by oxo simultaneously. By doing so, no chemically active or unstable group like an ester or aldehyde group will be introduced into the molecular structure of the compound represented by the formula (X). Specifically, assuming that the group

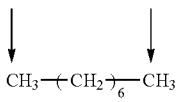

represents a 1 valent linear alkyl $$CH_3\text{—}(CH_2)_6\text{—}CH_2\text{—}$$

(comprising two terminal carbon atoms as indicated by the arrow marks in the formula) substituted by one oxo, according to the aforesaid principles, this group is preferably

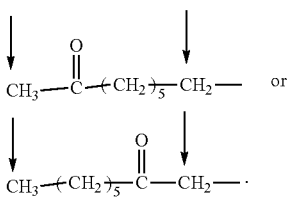

Or, assuming that the group

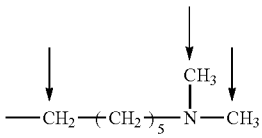

represents a 1 valent branched heteroalkyl

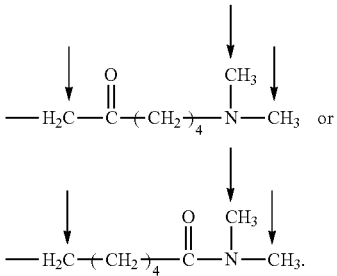

(comprising three terminal carbon atoms as indicated by the arrow marks in the formula, also comprising three carbon atoms directly bonding to a N atom) substituted by one oxo, according to the aforesaid principles, this group is preferably

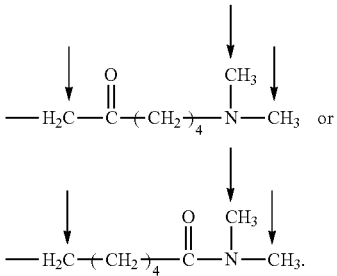

According to an embodiment of this invention (referred to as Embodiment B), when the group Func represents —NH— or —NH$_2$, in the formula (X), when oxo exists as the substituent, it is preferred that at least one oxo is positioned at the carbon atom directly bonding to the group Func, or in other words, at least one out of all carbon atoms directly bonding to the group Func has oxo thereon as the substituent, whereby introducing into the compound represented by the formula (X) a moiety (for example, amido) formed by directly bonding carbonyl to a N atom. Specifically, assuming that the group

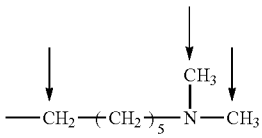

represents a 1 valent linear alkyl

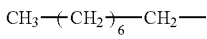

substituted by one oxo, the group Func represents —NH$_2$, then the compound represented by the formula (X), in addition to the

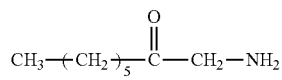

preferred by Embodiment A, could be further

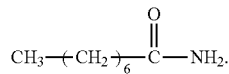

According to this invention, in Step (1), as the multifunctional compound, there may be exemplified a compound represented by the following formula (X-1), a compound represented by the following formula (X-2), a compound represented by the following formula (X-3) and a compound represented by the following formula (X-4). As these compounds, one kind or a mixture of two or more kinds at any ratio therebetween could be used.

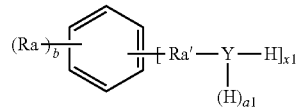

(X-1)

According to this invention, in the formula (X-1), plural group Ra may be identical to or different from one another, each independently selected from the group consisting of an optionally substituted $C_{1-20}$ linear or branched alkyl, an optionally substituted $C_{2-20}$ linear or branched alkenyl and an optionally substituted $C_{6-10}$ aryl, preferably an optionally substituted $C_{5-15}$ linear or branched alkyl and an optionally substituted $C_{6-10}$ aryl.

According to this invention, in the formula (X-1), plural group Ra' may be identical to or different from one another, each independently selected from the group consisting of a single bond, an optionally substituted $C_{1-10}$ linear or branched alkylene, an optionally substituted $C_{2-10}$ linear or branched alkenylene, carbonyl, an optionally substituted $C_{1-10}$ linear or branched alkylene carbonyl and an optionally substituted $C_{2-10}$ linear or branched alkenylene carbonyl, preferably each independently selected from the group consisting of a single bond and an optionally substituted $C_{1-6}$ linear or branched alkylene.

According to this invention, in the formula (X-1), the numerical value b represents an integer of from 0 to 3, preferably 1.

According to this invention, in the formula (X-1), the numerical value x1 represents the number of the group

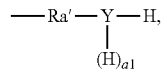

which is an integer from 1 to 6, preferably an integer from 1 to 4, for example, 2, 3 or 4. Obviously, b+x1≤6.

According to this invention, in the formula (X-1), plural group Y may be identical to or different from one another, each independently selected from the group consisting of N and O, with the proviso that when the group Y represents N, a1=1, when the group Y represents O, a1=0.

According to this invention, in the formula (X-1), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

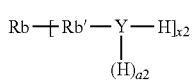

(X-2)

According to this invention, in the formula (X-2), the group Rb represents an optionally substituted $C_{1-50}$ linear or branched alkyl, an optionally substituted $C_{5-50}$ monocyclic or polycyclic cycloalkyl or an optionally substituted $C_{2-50}$ linear or branched alkenyl, preferably an optionally substituted $C_{1-29}$ linear or branched alkyl, an optionally substituted $C_{5-10}$ monocyclic or polycyclic cycloalkyl or an optionally substituted $C_{2-29}$ linear or branched alkenyl, more preferably an optionally substituted $C_{5-20}$ linear or branched alkyl, an optionally substituted $C_{5-8}$ monocyclic or polycyclic cycloalkyl or an optionally substituted $C_{5-20}$ linear or branched alkenyl, more preferably an optionally substituted $C_{8-20}$ linear or branched alkyl, an optionally substituted $C_{5-7}$ monocyclic cycloalkyl (for example, cyclohexyl) or an optionally substituted $C_{8-20}$ linear or branched alkenyl.

According to this invention, in the formula (X-2), plural group Rb' may be identical to or different from one another, each independently selected from the group consisting of a single bond and carbonyl.

According to this invention, in the formula (X-2), plural group Y may be identical to or different from one another, each independently selected from the group consisting of N and O, with the proviso that when the group Y represents N, a2=1, when the group Y represents O, a2=0.

According to this invention, in the formula (X-2), the numerical value x2 represents the number of the group

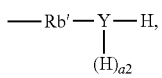

which is an integer of from 1 to 10, preferably an integer from 1 to 4, for example, 2, 3 or 4.

According to this invention, in the formula (X-2), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

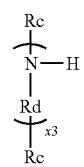

(X-3)

According to this invention, in the formula (X-3), plural group Rc may be identical to or different from one another, each independently selected from the group consisting of an optionally substituted $C_{1-20}$ linear or branched alkyl, an optionally substituted $C_{2-20}$ linear or branched alkenyl, an optionally substituted $C_{1-20}$ linear or branched alkyl carbonyl and an optionally substituted $C_{2-20}$ linear or branched alkenyl carbonyl, preferably each independently selected from the group consisting of an optionally substituted C5-20 linear or branched alkyl, an optionally substituted $C_{5-20}$ linear or branched alkenyl, an optionally substituted $C_{5-20}$ linear or branched alkyl carbonyl and an optionally substituted $C_{5-20}$ linear or branched alkenyl carbonyl, more preferably each independently selected from the group consisting of an optionally substituted $C_{8-20}$ linear or branched alkyl, an optionally substituted $C_{8-20}$ linear or branched alkenyl, an optionally substituted $C_{8-20}$ linear or branched alkyl carbonyl and an optionally substituted $C_{8-20}$ linear or branched alkenyl carbonyl.

According to this invention, in the formula (X-3), plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl, preferably each independently selected from the group consisting of an optionally substituted $C_{1-5}$ linear or branched alkylene and an optionally substituted $C_{1-5}$ linear or branched alkylene carbonyl.

According to this invention, in the formula (X-3), the numerical value x3 represents the number of the unit

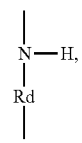

which is an integer of from 1 to 10, preferably an integer from 1 to 4, for example, 2, 3 or 4.

According to this invention, in the formula (X-3), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

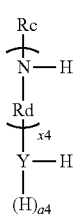

(X-4)

According to this invention, in the formula (X-4), the group Rc represents an optionally substituted $C_{1-20}$ linear or branched alkyl, an optionally substituted $C_{2-20}$ linear or branched alkenyl, an optionally substituted $C_{1-20}$ linear or branched alkyl carbonyl or an optionally substituted $C_{2-20}$ linear or branched alkenyl carbonyl, preferably each independently represents an optionally substituted $C_{5-20}$ linear or branched alkyl, an optionally substituted $C_{5-20}$ linear or branched alkenyl, an optionally substituted $C_{5-20}$ linear or branched alkyl carbonyl or an optionally substituted $C_{5-20}$ linear or branched alkenyl carbonyl, more preferably each independently represents an optionally substituted $C_{8-20}$ linear or branched alkyl, an optionally substituted $C_{8-20}$ linear or branched alkenyl, an optionally substituted $C_{8-20}$ linear or branched alkyl carbonyl or an optionally substituted $C_{8-20}$ linear or branched alkenyl carbonyl.

According to this invention, in the formula (X-4), plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl, preferably each independently selected from the group consisting of an optionally substituted $C_{1-5}$ linear or branched alkylene and an optionally substituted $C_{1-5}$ linear or branched alkylene carbonyl.

According to this invention, in the formula (X-4), the group Y represents N or O, with the proviso that when the group Y represents N, a4=1, when the group Y represents O, a4=0.

According to this invention, in the formula (X-4), the numerical value x4 represents the number of the unit

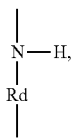

which is an integer of from 1 to 9, preferably an integer from 1 to 3, more preferably 1 or 2.

According to this invention, in the formula (X-4), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

According to this invention, the aforesaid multifunctional compound, the compound represented by the formula (X), the compound represented by the formula (X-1), the compound represented by the formula (X-2), the compound represented by the formula (X-3) or the compound represented by the formula (X-4), could be commercially available or produced in any conventional manner. For example, the compound represented by the formula (X-2) (wherein, Y=N, Rb' is carbonyl), i.e. 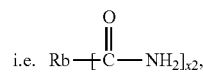

could be produced by reacting a compound represented by the following formula (X-2-1) (wherein, the group Rb and the numerical value x2 are as defined in the formula (X-2), the group $R_{ac}$ is H or a $C_{1-4}$ linear or branched alkyl) with an amidating agent (for example, diisopropanol amine) in the presence of an alkaline catalyst (referred to as amidating step).

 (X-2-1)

According to this invention, the amidating step could be conducted in any conventional manner, wherein the reaction temperature could be generally 100-200 degrees Celsius, the reaction duration could be generally 1-10 h, the reaction pressure could be the normal pressure or any pressure suitable for this reaction.

According to this invention, in the amidating step, as the alkaline catalyst, any alkaline catalyst conventionally used in this field for a similar purpose may be used as such, wherein preference is given to alkali metal hydroxide, especially NaOH or KOH. As the alkaline catalyst, one kind or a mixture of two or more kinds at any ratio therebetween could be used. As the amount of the alkaline catalyst to be used, any amount conventionally used in this field may be mentioned, but could be generally determined such that the alkaline catalyst accounts for 0.2-20 wt %, preferably 0.5-15 wt % of the total weight of the compound represented by the formula (X-2-1) and the amidating agent.

According to this invention, in the amidating step, the ratio by molar of the compound represented by the formula (X-2-1) and the amidating agent could be generally 1:1-15, 1:1-10, 1:1-8, 1:1-5 or 1:2-4, but not limiting thereto, which could be any ratio by molar sufficient to convert all (i.e. x2 in total) of the group —COOR$_{ac}$ into its corresponding amido.

According to this invention, upon completion of the amidating step, by any known separation method (for example, vacuum suction), any unreacted amidating agent is removed from the reaction product mixture, so as to obtain a compound represented by the formula (X-2) (wherein, Y=N, Rb' is carbonyl), without needing any further purification or separation.

Step (2): reacting the/an ether product with one or more compound(s) represented by the following formula (Z) in the presence of an alkaline catalyst, whereby obtaining the anionic surfactant (including the compound represented by the formula (I)).

According to this invention, the ether product to be used in Step (2) as the starting material could be the ether product directly obtained from Step (1), or may be commercially available, for example, those sold under the name of alkylphenol polyoxyethylene ether. Herein, if a commercially available ether product is used, it is preferred that prior to Step (2), the ether product is alkalized at a temperature of from the room temperature to 100 degrees Celsius in the presence of an alkaline catalyst for 1-10 h (referred to as alkalizing step). The thus obtained alkalized product could be used as such as the ether product for Step (2). In the alkalizing step, the ratio by molar of the ether product and the alkaline catalyst could be generally 1:1-10, preferably 1:1-5, but not limiting thereto. Of course, the ether product directly obtained from Step (1) could be or not be treated by this alkalizing step.

According to this invention, in Step (2) and the alkalizing step, as the alkaline catalyst, any alkaline catalyst conventionally used in this field for a similar purpose may be used as such, wherein preference is given to alkali metal hydroxide, especially NaOH or KOH. As the alkaline catalyst, one kind or a mixture of two or more kinds at any ratio therebetween could be used. For a simplified operation, the alkaline catalyst to be used in Step (2) and/or alkalizing step may be the same as that to be used in Step (1).

According to this invention, in Step (2) and the alkalizing step, as the amount of the alkaline catalyst to be used, any amount conventionally used in this field may be mentioned, but could be generally determined such that the ratio by molar of the ether product and the alkaline catalyst is 1:1-10, preferably 1:1-5. As aforesaid, Step (2) is generally conducted after Step (1) and/or the alkalizing step. In this context, given that a certain amount of alkaline catalyst has been used in Step (1) or the alkalizing step, some amount of the alkaline catalyst may remain from these steps; if this amount is still sufficient in catalyzing Step (2), no further alkaline catalyst will be added to Step (2), or if needed, a supplementary amount thereof will be added, which is obvious to a person skilled in the art.

G-L-AS (Z)

According to this invention, in the formula (Z), the group G represents a halogen atom or hydroxyl, preferably a halogen atom. As the halogen atom, for example, there may be exemplified fluorine atom, chlorine atom, bromine atom and iodine atom, preferably chlorine atom.

According to this invention, in the formula (Z), the group L represents an optionally substituted $C_{1-10}$ linear or branched alkylene or an optionally substituted $C_{2-10}$ linear or branched alkenylene, preferably an optionally substituted $C_{1-5}$ linear or branched alkylene.

According to this invention, in the formula (Z), the group AS represents a group represented by the formula -A$^-$(M')$_r^+$, wherein the group A$^-$ represents a carboxylate ion (COO$^-$) or a sulfonate ion (SO$_3^-$), the group M' represents hydrogen, alkali metal (preferably Li, Na or K), alkaline earth metal (preferably Mg or Ca) or ammonium (NH$_4$), preferably alkali metal (preferably Li, Na or K) or alkaline earth metal (preferably Mg or Ca).

According to this invention, when the group M' represents hydrogen, alkali metal or ammonium, r=1; when the group M' represents alkaline earth metal, r=0.5.

According to an embodiment of this invention, in the formula (Z), when the group A$^-$ represents the carboxylate ion (COO$^-$), the group G represents the halogen atom, when the group A$^-$ represents the sulfonate ion (SO$_3^-$), the group G represents the halogen atom or hydroxyl.

According to an embodiment of this invention, one or more compounds represented by the formula (Z) will be used, wherein in at least one compound represented by the formula (Z), the group A$^-$ represents a carboxylate ion (COO$^-$). In this context, to conduct Step (2), it is preferably that at least a compound represented by the formula (Z) bearing a carboxylate ion (COO$^-$) group be used.

According to this invention, in the formula (Z), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

According to this invention, in Step (2), the ratio by molar of the multifunctional compound or the ether product and the compound represented by the formula (Z) is 1:1-10, preferably 1:1-4, 1:1-3 or 1:2-5.

According to this invention, in Step (2), the reaction temperature could be generally from the room temperature to 200 degrees Celsius, preferably 50-100 degrees Celsius, the reaction duration could be generally 1-20 h, preferably from 1 to 10 h, while the reaction pressure could be any pressure suitable for this reaction, for example, the normal pressure.

According to this invention, upon completion of Step (2), by any known separation method, the reaction product mixture obtained from Step (2) is treated, whereby isolating the anionic surfactant. As the separation method, for example, there may be exemplified a method wherein firstly, into the reaction product mixture obtained from Step (2), an aqueous acid solution (for example, an aqueous solution of HCl, an aqueous solution of $H_2SO_4$, an aqueous solution of phosphoric acid, an aqueous solution of $NaHSO_4$, or an aqueous solution of $KHSO_4$) is introduced till a pH value of from 1 to 3 is reached, then the oil phase and the aqueous phase are separated, whereby obtaining the anionic surfactant as the oil phase.

According to this invention, upon completion of Step (2), if needed, the thus obtained anionic surfactant could be further made into contact with a neutralizing agent, whereby any free acid (for example, a free carboxylic acid or a free sulfonic acid) group on the anionic surfactant being converted into its corresponding salt (hereinafter referred to as neutralizing step). As the neutralizing agent, for example, there may be exemplified alkali metal (preferably Li, Na or K) hydroxides, alkaline earth metal (preferably Mg or Ca) hydroxides or aqueous ammonia. As the neutralizing agent, one kind or a mixture of two or more kinds at any ratio therebetween could be used. As the way to conduct the neutralizing step, for example, there may be exemplified a method wherein into the anionic surfactant, a certain amount of the neutralizing agent in the form of an aqueous solution or an aqueous suspension is introduced till a pH value of 7-9 or 8-10 is reached, then water is removed therefrom (for example, by evaporation under heat or vacuum), but not limiting thereto.

According to this invention, the anionic surfactant (including the compound represented by the formula (I)) could be presented, produced or used in the form of one single kind of compound or a mixture of two or more kinds. All these forms are covered by this invention and identified as being effective and desirable in this invention. In this context, according to this invention, it is not absolutely necessary to further purify the thus produced anionic surfactant, or to further isolate one or more specific compound from the thus produced anionic surfactant (if as a mixture). Nevertheless, as the purification or isolation method, there may be exemplified column chromatography or preparative chromatography.

According to this invention, the surfactant composition is produced by mixing a cationic-nonionic surfactant and the anionic surfactant. In this context, this invention further relates to a process for producing a surfactant composition, including a step of mixing a cationic-nonionic surfactant and the anionic surfactant (hereinafter referred to as mixing step).

According to this invention, in the surfactant composition, the cationic-nonionic surfactant and the anionic surfactant may each independently present, or associate with each other due to interaction between cations and anions, or even chemically react with each other (for example, by eliminating a compound represented by the formula $(M)_r^+$ $X^-$, wherein the group $X^-$ is as defined in the hereinafter described formula (II)) to form a new compound, without any specific limitation thereto. These forms are all covered by this invention, not limited by any literal wording.

According to this invention, in the mixing step, the ratio by molar of the cationic-nonionic surfactant and the anionic surfactant could be generally 1:0.01-100, preferably 1:0.1-10.

According to this invention, the mixing step may generally follow the aforesaid Step (2), whereby sometimes referred to as Step (3).

According to this invention, the mixing step or Step (3) could be conducted in the presence of water. The amount of water to be used is determined such that the cationic-nonionic surfactant and the anionic surfactant could be thoroughly mixed with each other, without any specific limitation thereto. Further, for an easy mixing, the anionic surfactant and/or the cationic-nonionic surfactant could be used in the form of an aqueous solution.

According to this invention, the cationic-nonionic surfactant is a compound represented by the following formula (II). As the compound, one kind or a mixture of two or more kinds at any ratio therebetween could be used.

(II)

According to this invention, in the formula (II), the group $N^+$ represents a quaternary nitrogen cation, whereby introducing a quaternary ammonium group into the compound represented by the formula (II).

According to this invention, in the formula (II), the groups $R_1$ to $R_3$ may be identical to or different from one another, each independently selected from the group consisting of an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl, an optionally substituted $C_{6-50}$ aryl and a group represented by the formula

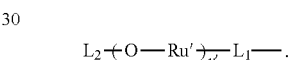

According to this invention, in the formula (II), it is required that at least one (for example, two at most) out of the groups $R_1$ to $R_3$ represent a group represented by the formula

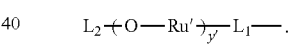

According to this invention, in the formula (II), the group Rh represents an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl or an optionally substituted $C_{6-50}$ aryl.

According to this invention, in the formula (II), in each definition of the groups $R_1$ to $R_3$ and the group Rh, as the $C_{1-50}$ linear or branched alkyl, for example, there may be exemplified a $C_{1-20}$ linear or branched alkyl or a $C_{8-20}$ linear or branched alkyl, specifically octadecyl, lauryl, octyl, hexadecyl, hexyl, methyl or ethyl, and so on. As the $C_{5-50}$ monocyclic or polycyclic cycloalkyl, for example, there may be exemplified a $C_{5-10}$ monocyclic or polycyclic cycloalkyl, a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-50}$ linear or branched alkenyl, for example, there may be exemplified a $C_{2-20}$ linear or branched alkenyl or a $C_{8-20}$ linear or branched alkenyl, specifically octadecenyl, dodecenyl, linolyl, vinyl, propenyl or allyl, and so on. As the $C_{6-50}$ aryl, for example, there may be exemplified a $C_{6-20}$ aryl or a $C_{6-10}$ aryl, specifically phenyl or naphthyl.

According to a specific embodiment of this invention, in the formula (II), at least one out of the groups $R_1$ to $R_3$ and the group Rh represents an optionally substituted $C_{8-30}$ linear or branched alkyl or an optionally substituted $C_{8-30}$ linear or branched alkenyl. As the $C_{8-30}$ linear or branched alkyl, preferably, there may be exemplified a $C_{8-20}$ linear or branched alkyl, specifically octadecyl, lauryl, octyl, or hexadecyl. As the $C_{8-30}$ linear or branched alkenyl, preferably, there may be exemplified a $C_{8-20}$ linear or branched alkenyl, specifically octadecenyl, dodecenyl, or linolyl.

According to this invention, in the formula (II), the group $X^-$ represents a halogen ion (including fluoride ion, chloride ion, bromide ion or iodide ion) or hydroxide ion ($OH^-$), wherein preference is given to a halogen ion, more preferably chloride ion.

According to this invention, in the formula (II), in the group represented by the formula

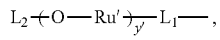

the group Li represents a single bond, a $C_{1-10}$ linear or branched alkylene oxy, a $C_{2-10}$ linear or branched alkenylene oxy or a $C_{6-10}$ arylene oxy, preferably a single bond or a $C_{1-5}$ linear or branched alkylene oxy, especially a single bond. Obviously, any terminal O atom in the group $L_1$ bonds to the group Ru'.

According to this invention, in the formula (II), in the group represented by the formula

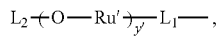

the numerical value y' represents a value of from 0 to 200, excluding 0. Preferably, the numerical value y' represents a value of from 0 to 100, excluding 0. Herein, the numerical value y' represents an average number of the unit —O—Ru'— in the group represented by the formula

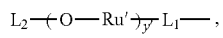

and thus could be a non-integer or an integer. As the numerical value y', for example, there may be exemplified 0.1, 0.5, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7, and so on.

According to this invention, in the formula (II), in the group represented by the formula

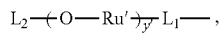

plural group Ru' may be identical to or different from one another, each independently represents a $C_{2-6}$ linear or branched alkylene, preferably —$CH_2$—$CH_2$— or —$CH_2$—$CH(CH_3)$—. Herein, in the group represented by the formula

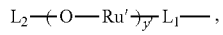

when the group Ru' represents two or more out of the $C_{2-6}$ linear or branched alkylene, these (different) units —O—Ru'— may bond to one another at any predetermined ratio therebetween so as to form into a random, a (di-or multi-) block or an alternative copolymer segment, with the proviso that the overall (average) number of these units corresponds to the numeral value y'. For example, assuming that the group Ru' represents the combination of —$CH_2$—$CH_2$— and —$CH_2$—$CH(CH_3)$—, and y' is 2.2, the unit —O—$CH_2$—$CH_2$— and the unit

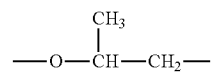

could bond to each other so as to form a (di-or multi-) block, alternative, or random copolymer segment at any predetermined ratio therebetween (wherein for example, the ratio by molar therebetween could be 1:99 to 99:1), with the proviso that the total (average) number of these two units is 2.2.

According to an embodiment of this invention, in the formula (II), in the group represented by the formula

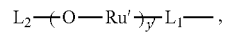

it is preferred that at least a part of (at least a certain amount of) the group Ru' represents a $C_{3-6}$ linear or branched alkylene (corresponding to a non-EO unit), wherein preference is given to —$CH_2$—$CH(CH_3)$— (corresponding to the unit

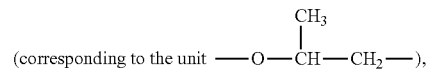

whereby making the group represented by the formula

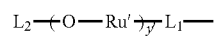

to comprise (a certain amount of, with a upper limit value of y') the non-EO unit (for example, the unit

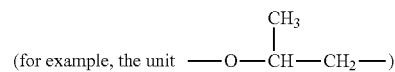

as the essential constituting unit.

According to an embodiment of this invention, in the formula (II), in the group represented by the formula

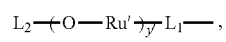

the group

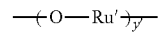

represents a (diblock) ether segment represented by the following formula (II-1). Herein, as illustrated by the formula (II-1), the unit —O—$CH_2$—$CH_2$— and the unit

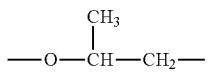

bond into a (di)block copolymer segment.

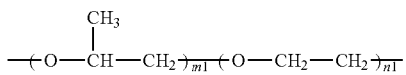
(II-1)

According to the embodiment of this invention, preferably, the ether segment represented by the formula (II-1) bonds to the group L2 and the group $L_1$ in a manner represented by the following formula,

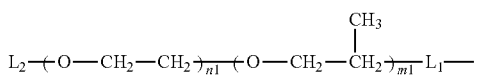

According to the embodiment of this invention, in the formula (II-1), the numerical value m1 represents a value of from 0 to 100, preferably a value of from 0 to 50. Herein, the numerical value m1 represents an average number of the unit

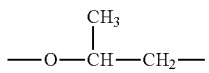

in the ether segment represented by the formula (II-1), and thus could be a non-integer or an integer. As the numerical value m1, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to the embodiment of this invention, in the formula (II-1), the numerical value n1 represents a value of from 0 to 100, preferably a value of from 0 to 50. Herein, the numerical value n1 represents an average number of the unit —O—$CH_2$—$CH_2$— in the ether segment represented by the formula (II-1), and thus could be a non-integer or an integer. As the numerical value n1, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to the embodiment of this invention, in the formula (II-1), the sum of the numerical value m1 and the numerical value n1 (i.e. throughout the ether segment represented by the formula (II-1), the overall average number of the unit

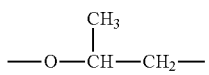

and the unit —O—$CH_2$—$CH_2$—) is greater than 0 and not greater than 200, preferably not greater than 100. In this context, in the ether segment represented by the formula (II-1), it is necessary to contain (a certain amount of) the unit —O—$CH_2$—$CH_2$— and/or the unit

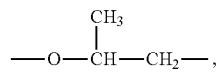

preferably, it is necessary to contain (a certain amount of) the unit

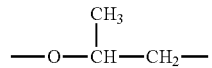

(i.e. the numerical value m1 being greater than 0), or necessary to contain (a certain amount of) the unit —O—$CH_2$—$CH_2$— and the unit

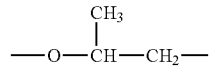

(i.e. the numerical value m1 being greater than 0, and the numerical value n1 greater than 0). Herein, in the ether segment represented by the formula (II-1), as the overall average number of these two units, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (II), in the group represented by the formula

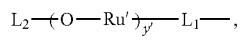

the group $L_2$ represents hydrogen, an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl, or an optionally substituted $C_{6-50}$ aryl. As the $C_{1-50}$ linear or branched alkyl, for example, there may be exemplified a $C_{1-30}$ linear or branched alkyl, a $C_{1-20}$ linear or branched alkyl or a $C_{1-10}$ linear or branched alkyl, specifically octadecyl, hexadecyl, lauryl, hexyl, methyl or ethyl, and so on. As the $C_{5-50}$ monocyclic or polycyclic cycloalkyl, for example, there may be exemplified a $C_{5-10}$ monocyclic or polycyclic cycloalkyl, a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-50}$ linear or branched alkenyl, for example, there may be exemplified a $C_{2-30}$ linear or branched alkenyl, a $C_{2-20}$ linear or branched alkenyl or a $C_{2-10}$ linear or branched alkenyl, specifically octadecenyl, dodecenyl, linolyl, vinyl, propenyl or allyl, and so on. As the $C_{6-50}$ aryl, for example, there may be exemplified a $C_{6-20}$ aryl or a $C_{6-10}$ aryl, specifically phenyl or naphthyl.

According to this invention, in the formula (II), by optionally substituted, it refers to optionally substituted by one or more (for example, from 1 to 5, from 1 to 4, from 1 to 3, from 1 to 2 or 1) substituent selected from the group consisting of a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

According to this invention, the compound represented by the formula (II) may be commercially available or produced in a conventional manner. For example, as a method for producing the compound represented by the formula (II), for example, there may be exemplified a method comprising the following Step (II-1) to Step (II-4).

Step (II-1):reacting an amine represented by the following formula (II-X) with an alkylene oxide represented by the following formula (II-Y) in the presence of an alkaline catalyst, to obtain an ether product B.

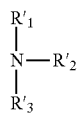
(II-X)

According to this invention, in the formula (II-X), the group $R'_1$ to $R'_3$ may be identical to or different from one another, each independently selected from the group consisting of an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl, an optionally substituted $C_{6-50}$ aryl and a group represented by the formula $H-L'_1-$.

According to this invention, in the formula (II-X), it is required that at least one (for example, two at most) out of the groups $R'_1$ to $R'_3$ represent a group represented by the formula $H-L'_1-$.

According to this invention, in the formula (II-X), in the definition of the groups $R'_1$ to $R'_3$, as the $C_{1-50}$ linear or branched alkyl, for example, there may be exemplified a $C_{1-20}$ linear or branched alkyl or a $C_{8-20}$ linear or branched alkyl, specifically octadecyl, lauryl, octyl, hexadecyl, hexyl, methyl or ethyl, and so on. As the $C_{5-50}$ monocyclic or polycyclic cycloalkyl, for example, there may be exemplified a $C_{5-10}$ monocyclic or polycyclic cycloalkyl, a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-50}$ linear or branched alkenyl, for example, there may be exemplified a $C_{2-20}$ linear or branched alkenyl or a $C_{8-20}$ linear or branched alkenyl, specifically octadecenyl, dodecenyl, linolyl, vinyl, propenyl or allyl, and so on. As the $C_{6-50}$ aryl, for example, there may be exemplified a $C_{6-20}$ aryl or a $C_{6-10}$ aryl, specifically phenyl or naphthyl.

According to this invention, in the formula (II-X), in the group represented by the formula $H-L'_1-$, the group $L'_1$ represents a single bond, a $C_{1-10}$ linear or branched alkylene oxy, a $C_{2-10}$ linear or branched alkenylene oxy or a $C_{6-10}$ arylene oxy, preferably a single bond or a $C_{1-5}$ linear or branched alkylene oxy, especially a single bond. Obviously, any terminal O atom in the group $L'_1$ bonds to H.

(II-Y)

According to this invention, in the formula (II-Y), the group Ru' represents a $C_{2-6}$ linear or branched alkylene, wherein preference is given to —$CH_2$—$CH_2$— and/or —$CH_2$—$CH(CH_3)$—, more preferably a combination of —$CH_2$—$CH_2$— and —$CH_2$—$CH(CH_3)$—.

According to this invention, in Step (II-1), as the alkylene oxide represented by the formula (II-Y), for example, there may be exemplified ethylene oxide, propylene oxide, butylene oxide, hexene oxide, and so on. As these alkylene oxides, one kind or a mixture of two or more kinds at any ratio therebetween could be used, for example, a combination of ethylene oxide and propylene oxide.

According to this invention, one or more alkylene oxide represented by the formula (II-Y) is used, preferably at least propylene oxide is used. Propylene oxide may if needed co-use with any other alkylene oxide represented by the formula (II-Y) (especially ethylene oxide). In this combination, the ratio by molar of propylene oxide and said other alkylene oxide represented by the formula (II-Y) (especially ethylene oxide), for example, may be 1:0.1-10, but not limiting thereto.

According to this invention, in Step (II-1), as the alkaline catalyst, any alkaline catalyst conventionally used in this field for a similar purpose may be used as such, wherein preference is given to alkali metal hydroxide, especially KOH. As the alkaline catalyst, one kind or a mixture of two or more kinds at any ratio therebetween could be used.

According to this invention, in Step (II-1), as the amount of the alkaline catalyst to be used, any amount conventionally used in this field may be mentioned, but could be generally determined such that the ratio by molar of the amine represented by the formula (II-X) and the alkaline catalyst is 1:1-10, preferably 1:1-5.

According to this invention, in Step (II-1), the ratio by molar of the amine represented by the formula (II-X) and the alkylene oxide could be generally 1:0-200, preferably 1:0-100, excluding 0, more preferably 1:0.1-50.

According to this invention, in Step (II-1), the reaction temperature could be generally from the room temperature to 300 degrees Celsius, preferably 100-200 degrees Celsius, the reaction duration could be generally 1-20 h, preferably from 1 to 10 h, while the reaction pressure could be any pressure suitable for this reaction, for example, the normal pressure.

According to a preferred embodiment of this invention, in Step (II-1), as the alkylene oxide represented by the formula (II-Y), if two or more thereof (preferably comprising at least propylene oxide) are used as a combination, the amine is made to firstly react with (at least a partial or a whole amount of) propylene oxide, and then (preferably upon at least partial or totally completion of the reaction with propylene oxide) react with any other alkylene oxide (for example, ethylene oxide).

According to this invention, upon completion of Step (II-1), the thus obtained reaction product mixture could be used as such as the ether product B to conduct the succeeding Step (II-2) without any separation or purification thereto, or simply after separating off the alkaline catalyst (for example, by water washing).

Step (II-2): reacting the ether product B and a quaternizing agent represented by the following formula (II-A), whereby obtaining the cationic-nonionic surfactant.

$$Rh—X' \quad (II\text{-}A)$$

According to this invention, in the formula (II-A), the group Rh represents an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl or an optionally substituted $C_{6-50}$ aryl. As the $C_{1-50}$ linear or branched alkyl, for example, there may be exemplified a $C_{1-20}$ linear or branched alkyl or a $C_{8-20}$ linear or branched alkyl, specifically octadecyl, lauryl, octyl, hexadecyl, hexyl, methyl or ethyl, and so on. As the $C_{5-50}$ monocyclic or polycyclic cycloalkyl, for example, there may be exemplified a $C_{5-10}$ monocyclic or polycyclic cycloalkyl, a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-50}$ linear or branched alkenyl, for example, there may be exemplified a $C_{2-20}$ linear or branched alkenyl or a $C_{8-20}$ linear or branched alkenyl, specifically octadecenyl, dodecenyl, linolyl, vinyl, propenyl or allyl, and so on. As the $C_{6-50}$ aryl, for example, there may be exemplified a $C_{6-20}$ aryl or a $C_{6-10}$ aryl, specifically phenyl or naphthyl.

According to a specific embodiment of this invention, taking into consideration of the formula (II-X) and the formula (II-A) altogether, at least one out of the groups $R'_1$ to $R'_3$ and the group Rh represents an optionally substituted $C_{8-30}$ linear or branched alkyl or an optionally substituted $C_{8-30}$ linear or branched alkenyl. As the $C_{8-30}$ linear or branched alkyl, preferably, there may be exemplified a $C_{8-20}$ linear or branched alkyl, specifically octadecyl, lauryl, octyl, or hexadecyl. As the $C_{8-30}$ linear or branched alkenyl, preferably, there may be exemplified a $C_{8-20}$ linear or branched alkenyl, specifically octadecenyl, dodecenyl, or linolyl.

According to this invention, in the formula (II-A), the group X' represents a halogen atom, including fluorine atom, chlorine atom, bromine atom and iodine atom, wherein preference is given to chlorine atom.

According to this invention, in Step (II-2), the ratio by molar of the ether product B and the quaternizing agent represented by the formula (II-A) could be generally 1:0.1-200, preferably 1:0.1-50.

According to this invention, in Step (II-2), the reaction temperature could be generally 0-300 degrees Celsius, preferably 50-200 degrees Celsius, the reaction duration could be generally 1-20 h, preferably from 1 to 10 h, while the reaction pressure could be any pressure suitable for this reaction, for example, the normal pressure.

According to this invention, Step (II-2) could be conducted in the presence of or in the absence of a catalyst. As the catalyst, any catalyst conventionally used in this field for a similar purpose may be used as such, specifically KI. As the amount of the catalyst to be used, any amount conventionally used in this field may be mentioned, e.g. 0.5-3.0 wt %, especially 1.0-2.0 wt %.

According to this invention, upon completion of Step (II-2), any separation method conventionally used in this field could be used to treat the reaction product mixture obtained from Step (II-2), whereby isolating the cationic-nonionic surfactant. As the separation method, for example, there may be exemplified extraction under an alkali condition.

Step (II-3): if needed, at least a part (or all) of the quaternary ammonium salt group on the molecular structure of the thus obtained cationic-nonionic surfactant being converted into the corresponding quaternary ammonium hydroxide group, and/or, at least a part (or all) of the quaternary ammonium hydroxide group on the molecular structure of the thus obtained cationic-nonionic surfactant being converted into the corresponding quaternary ammonium salt group.

According to this invention, Step (II-3) is an optional step, not an indispensable step.

According to this invention, Step (II-3) could be conducted in any conventional manner, for example, by electrolyzation or ion exchanging, without any specific limitation thereto.

Step (II-4): reacting the cationic-nonionic surfactant with a compound represented by the following formula (II-Z) in the presence of an alkaline catalyst (referred to as Step (II-4A)), and/or, prior to Step (II-2), reacting the ether product B with a compound represented by the following formula (II-Z) in the presence of an alkaline catalyst (referred to as Step (II-4B)).

In the context of this invention, the product obtained from Step (II-1) and the product obtained from Step (II-4B) are indiscriminately referred to as ether product B, and the product obtained from Step (II-2), the product obtained from Step (II-3) and the product obtained from Step (II-4A) are indiscriminately referred to as cationic-nonionic surfactant.

According to this invention, Step (II-4) is an optional step, not an indispensable step.

$$G\text{-}L_2' \quad (II\text{-}Z)$$

According to this invention, in the formula (II-Z), the group G represents a halogen atom, including fluorine atom, chlorine atom, bromine atom and iodine atom, wherein preference is given to chlorine atom.

According to this invention, in the formula (II-Z), the group $L_2'$ represents an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl or an optionally substituted $C_{6-50}$ aryl. As the $C_{1-50}$ linear or branched alkyl, for example, there may be exemplified a $C_{1-30}$ linear or branched alkyl, a $C_{1-20}$ linear or branched alkyl or a $C_{1-10}$ linear or branched alkyl, specifically octadecyl, hexadecyl, lauryl, hexyl, methyl or ethyl, and so on. As the $C_{5-50}$ monocyclic or polycyclic cycloalkyl, for example, there may be exemplified a $C_{5-10}$ monocyclic or polycyclic cycloalkyl, a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-50}$ linear or branched alkenyl, for example, there may be exemplified a $C_{2-30}$ linear or branched alkenyl, a $C_{2-20}$ linear or branched alkenyl or a $C_{2-10}$ linear or branched alkenyl, specifically octadecenyl, dodecenyl, linolyl, vinyl, propenyl or allyl, and so on. As the $C_{6-50}$ aryl, for example, there may be exemplified a $C_{6-20}$ aryl or a $C_{6-10}$ aryl, specifically phenyl or naphthyl.

According to this invention, in Step (II-4), as the alkaline catalyst, any alkaline catalyst conventionally used in this field for a similar purpose may be used as such, wherein preference is given to alkali metal hydroxide, especially NaOH or KOH. As the alkaline catalyst, one kind or a mixture of two or more kinds at any ratio therebetween could be used.

According to this invention, in Step (II-4), as the amount of the alkaline catalyst to be used, any amount conventionally used in this field may be mentioned, but could be generally determined such that the ratio by molar of the cationic-nonionic surfactant or the ether product B and the alkaline catalyst is 1:1-10, preferably 1:1-5.

According to this invention, in Step (II-4), the ratio by molar of the cationic-nonionic surfactant or the ether product B and the compound represented by the formula (II-Z) could be generally 1:1-10, preferably 1:1-4 or 1:2-5.

According to this invention, in Step (II-4), the reaction temperature could be generally from the room temperature to 200 degrees Celsius, preferably 50-100 degrees Celsius, the reaction duration could be generally 1-20 h, preferably from 1 to 10 h, while the reaction pressure could be any pressure suitable for this reaction, for example, the normal pressure.

According to this invention, upon completion of Step (II-4), any conventional separation method could be used to treat the reaction product mixture obtained from Step (II-4), whereby isolating the cationic-nonionic surfactant or the ether product B as the reaction product. As the separation method, for example, there may be exemplified nanofiltration.

According to this invention, in the process for producing the cationic-nonionic surfactant, by optionally substituted, it refers to optionally substituted by one or more (for example, from 1 to 5, from 1 to 4, from 1 to 3, from 1 to 2 or 1) substituent selected from the group consisting of a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl.

According to this invention, the cationic-nonionic surfactant could be presented, produced or used in the form of one single kind of compound or a mixture of two or more kinds. All these forms are covered by this invention and identified as being effective and desirable in this invention. In this context, according to this invention, it is not absolutely necessary to further purify the thus produced cationic-nonionic surfactant, or to further isolate one or more specific compound from the thus produced cationic-nonionic surfactant (if as a mixture). Nevertheless, as the purification or isolation method, there may be exemplified column chromatography or preparative chromatography.

The surfactant composition according to this invention, since there exists a strong electrostatic attraction between the opposite anionic charges and cationic charges, which significantly increases the amount of the surfactant molecule adsorbed at the interface and significantly reduces the critical micelle concentration, exhibits a much higher interfacial activity as compared with one single surfactant. At the same time, thanks to the significantly higher interfacial activity of the present surfactant composition, an aqueous solution thereof exhibits significantly lowered interfacial tension for crude oil, whereby facilitating reduction of the cohesive force inside crude oil, which facilitates outflow of crude oil and greatly enhances the oil displacement efficiency. On the other hand, the present surfactant composition can change the surface wettability of crude oil. Specifically, the cationic surfactant in the surfactant composition desorbs the negatively charged groups adsorbed on a solid surface by reacting with same, whereby changing the oil wetable surface into a neutral or water wetable surface, decreasing the adhesion work of crude oil to the solid surface, which will facilitate stripping of crude oil. At the same time, the present surfactant composition solubilizes crude oil, which helps to wash down any crude oil attached to strata rock or sand, whereby enhancing the oil recovery. In this context, the surfactant composition according to this invention is particularly suitable for producing a flooding fluid composition for tertiary oil recovery (a flooding fluid).

According to an embodiment of this invention, further related to is a flooding fluid composition for tertiary oil recovery, which comprises the surfactant composition of this invention as aforesaid and water.

According to this invention, in the flooding fluid composition for tertiary oil recovery, on the basis of the total weight of the flooding fluid composition for tertiary oil recovery (as 100 wt %), the surfactant composition accounts for generally 0.001-10 wt %, preferably 0.005-5 wt %, more preferably 0.02-1 wt %, further preferably 0.02-0.5 wt %, more preferably 0.02-0.35 wt %.

According to this invention, the flooding fluid composition for tertiary oil recovery could further (if needed) comprise an additive conventionally used in this field for this purpose, including but not limiting to, a cationic water-soluble polymer, an anionic water-soluble polymer, or a fatty alcohol ether as the solvent, and so on. As the additive, one kind or a mixture of two or more kinds at any ratio therebetween could be used, at an amount conventionally used in this field.

According to this invention, as the cationic water-soluble polymer, for example, there may be exemplified polyacrylamide. The polyacrylamide may have a number averaged molecular weight of generally from 10,000,000 to 40,000,000, preferably from 10,000,000 to 30,000,000, at an amount of 0.05-5.0 wt %, preferably 0.1-0.5 wt %, on the basis of the total weight of the flooding fluid composition for tertiary oil recovery, but not limiting thereto.

According to this invention, the flooding fluid composition for tertiary oil recovery exhibits a high oil displacement efficiency and a high oil washing capability even in the absence of an inorganic alkali as a component. In this context, according to a preferred embodiment of this invention, the present flooding fluid composition for tertiary oil recovery contains no (or is not intentionally added with) inorganic alkali as a component. As the inorganic alkali, for example, there may be exemplified any inorganic alkaline compound conventionally used in this field for or with a flooding fluid composition for tertiary oil recovery, especially alkali metal carbonates, for example, sodium carbonate, sodium bicarbonate, and so on.

According to this invention, the flooding fluid composition for tertiary oil recovery could be produced in line with the following process.

According to this invention, the process for producing the flooding fluid composition for tertiary oil recovery includes a step of mixing the surfactant composition of this invention as aforesaid with water (and if needed, the aforesaid additive) till homogeneous.

According to this invention, the surfactant composition or the flooding fluid composition for tertiary oil recovery could be used in a tertiary oil recovery process, and exhibits significantly improved oil displacement efficiency and oil washing capability (for example, with an oil washing rate of more than 40% for crude oil) as compared with the prior art, whereby significantly enhancing crude oil recovery. In this context, this invention further relates to a tertiary oil recovery process, including a step of conducting tertiary oil recovery in the presence of as a flooding fluid, the surfactant composition of this invention as aforesaid or the flooding fluid composition for tertiary oil recovery of this invention as aforesaid.

According to a preferred embodiment of this invention, when conducting the tertiary oil recovery process, no inorganic alkali will be used or be intentionally involved. In this context, the tertiary oil recovery process of this invention shows no harm to the reservoir and oil wells, not corrosive to equipments and pipings, and causes no demulsification difficulty.

EXAMPLE

The present invention is further illustrated by using the following examples, but not limiting to same.

Example 1

N,N-dioctyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen for 4 times, the pressure in the reactor was adjusted to 0.2 MPa. The reaction system was heated to a temperature of 220 degrees Celsius, with the help of nitrogen at a pressure of 0.8 MPa, propylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

Sodium laurate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:0.2 were mixed till homogenous, to obtain the surfactant composition 1-1, the particulars of which were listed in Table 1-1.

Potassium octadecanol polyethylene oxide ether carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:0.1 were mixed till homogenous, to obtain the surfactant composition 1-2, the particulars of which were listed in Table 1-1.

Example 2

N,N-diallyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, propylene oxide was introduced into the reactor, reacted for 5 h, then with the help of nitrogen gas at a pressure of 0.8 MPa, ethylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

Ammonium oleyl alcohol polyethylene oxide ether carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:1.1 were mixed till homogenous, to obtain the surfactant composition 1-3, the particulars of which were listed in Table 1-1.

Calcium oleic acid monoethanol amide polyethylene oxide ether carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:2.2 were mixed till homogenous, to obtain the surfactant composition 1-4, the particulars of which were listed in Table 1-1.

Example 3

N,N-dicyclohexyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, propylene oxide was introduced into the reactor, reacted for 5 h, then with the help of nitrogen gas at a pressure of 0.8 MPa, ethylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

Sodium cyclohexanol polyethylene oxide ether carboxylate and the thus produced cationic-nonionic surfactant were dissolved into water respectively, stirred for 30 minutes and formulated into a 0.3 wt % aqueous solution, and then the thus obtained solutions at a ratio by molar between the cationic-nonionic surfactant and the anionic surfactant of 1:9 were mixed till homogenous, to obtain the surfactant composition 1-5, the particulars of which were listed in Table 1-1.

Magnesium dodecyl sulfonate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:0.9 were mixed till homogenous, to obtain the surfactant composition 1-6, the particulars of which were listed in Table 1-1.

Example 4

N,N-dioctyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, ethylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

Calcium dodecyl benzene polyethylene oxide ether carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:4.1 were mixed till homogenous, to obtain the surfactant composition 1-7, the particulars of which were listed in Table 1-1.

Bisphenol A and KOH were introduced into a reactor, heated to a temperature of 80 degrees Celsius, under continuous stirring to remove any volatile from the reaction system, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of KOH, under continuous stirring, under benzene/water azeotropy, the ether product was totally converted into the corresponding potassium alkoxide. Into the reactor, there was added a small amount of sodium chloroacetate, reacted for 2-10 h to obtain 4,4'-(1-methyl ethylene) bisphenyl phenol polyethylene oxide ether sodium monocarboxylate. After purified by chromatography, there were added benzene as the solvent and 3-5 parts of KOH, heated to a temperature of 80 degrees Celsius, under continuous stirring, under benzene/water azeotropy, the ether product was totally converted into the corresponding potassium alkoxide. Into the reactor, there was added chloromethyl sodium sulfonate, reacted for 2-10 h to obtain 4,4'-(1-methyl ethylene)bisphenyl phenol polyethylene oxide ether sodium carboxylate polyethylene oxide ether sodium sulfonate. The product was adjusted to an acidic pH value, then washed twice with a 15 wt % NaCl aqueous solution, then adjusted with a 50% NaOH, whereby converting the resultant into the corresponding sodium salt, finally removing by rotary evaporation the solvent from the product to obtain the aimed product 4,4'-(1-methyl ethylene)bisphenyl phenol polyethylene oxide ether sodium carboxylate polyethylene oxide ether sodium sulfonate. This product and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:5.8 were mixed till homogenous, to obtain the surfactant composition 1-8, the particulars of which were listed in Table 1-1.

Example 5

N-cyclohexyl-N-dodecyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, propylene oxide was introduced into the reactor, reacted for 5 h, then with the help of nitrogen gas at a pressure of 0.8 MPa, ethylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

Sodium octyl phenol polyethylene oxide ether carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:0.3 were mixed till homogenous, to obtain the surfactant composition 2-1, the particulars of which were listed in Table 1-2.

Sodium lauryl alcohol polyethylene oxide ether carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:0.1 were mixed till homogenous, to obtain the surfactant composition 2-2, the particulars of which were listed in Table 1-2.

Example 6

N-benzyl-N-octyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, ethylene oxide was introduced into the reactor, reacted for 5 h, then with the help of nitrogen gas at a pressure of 0.8 MPa, propylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

Tristyryl phenol and KOH were introduced into a reactor, heated to a temperature of 80 degrees Celsius, under continuous stirring to remove any volatile from the reaction system, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of KOH, under continuous stirring, under azeotropy, the ether product was totally converted into the corresponding potassium alkoxide. Into the reactor, there was added sodium chloroacetate, reacted for 2-10 h and then stopped the reaction. The product was adjusted with a HCl solution to an acidic pH value, then washed twice with a 15% NaCl aqueous solution, then adjusted with a 15 wt % calcium hydroxide, whereby the product being converted into the corresponding calcium salt, finally removing by rotary evaporation the solvent from the product, to obtain tristyryl phenol polyethylene oxide ether calcium carboxylate.

Tristyryl phenol polyethylene oxide ether calcium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:1.2 were mixed till homogenous, to obtain the surfactant composition 2-3, the particulars of which were listed in Table 1-2.

Oleyl alcohol polyethylene oxide ether ammonium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:2.0 were mixed till homogenous, to obtain the surfactant composition 2-4, the particulars of which were listed in Table 1-2.

Example 7

N,N-dicyclohexyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, propylene oxide was introduced into the reactor, reacted for 5 h, then with the help of nitrogen gas at a pressure of 0.8 MPa, ethylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

4-hexadecyl aniline and KOH were introduced into a reactor, heated to a temperature of 80 degrees Celsius, the pressure was reduced to a vacuum of 0.9, under continuous stirring to remove any volatile from the reaction system, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of KOH, under continuous stirring, under benzene/water azeotropy, the ether product was totally converted into the corresponding potassium alkoxide. Into the reactor, there was added sodium chloroacetate, reacted for 2-10 h and then stopped the reaction. The resultant was washed twice with a 15 wt % NaCl aqueous solution, then adjusted with a 15% KOH aqueous solution, whereby converting the resultant into the corresponding potassium salt, finally removing by rotary evaporation the solvent from the product, to obtain the aimed product.

4-hexadecyl aniline polyethylene oxide ether potassium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:10 were mixed till homogenous, to obtain the surfactant composition 2-5, the particulars of which were listed in Table 1-2.

Lauric acid monoethanol amide polyethylene oxide ether magnesium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:0.9 were mixed till homogenous, to obtain the surfactant composition 2-6, the particulars of which were listed in Table 1-2.

Example 8

N,N-dioctyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, propylene oxide was introduced into the reactor, reacted for 5 h, then with the help of nitrogen gas at a pressure of 0.8 MPa, ethylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

Dioctyl aniline polyethylene oxide ether ammonium carboxylate polyethylene oxide ether ammonium sulfonate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:4 were mixed till homogenous, to obtain the surfactant composition 2-7, the particulars of which were listed in Table 1-2.

Oleic acid monoethanol amide polyethylene oxide ether potassium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:6 were mixed till homogenous, to obtain the surfactant composition 2-8, the particulars of which were listed in Table 1-2.

Example 9

N-cyclohexyl-N-dodecyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, ethylene oxide was introduced into the reactor, reacted for 5 h, then with the help of nitrogen gas at a pressure of 0.8 MPa, propylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

Lauric acid, KOH and monoethanolamine were introduced into a reactor, heated to a temperature of 180 degrees Celsius, continuously removing by distillation the produced water, reacted for 8 h and then stopped, recrystallizated with toluene to obtain dilauric acid monoethanol imide. The resultant and KOH were introduced into a reactor, heated to a temperature of 80 degrees Celsius, under continuous stirring to remove any volatile from the reaction system, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of KOH, under continuous stirring, under benzene/water azeotropy, the ether product was totally converted into the corresponding potassium alkoxide. Into the reactor, there was added sodium chloroacetate, reacted for 2-10 h and then stopped the reaction, then adjusted to an acidic pH value, the resultant was washed twice with a 15 wt % NaCl aqueous solution, then adjusted with NaOH, whereby converting the resultant into the corresponding sodium salt, finally removing by rotary evaporation the solvent from the product, to obtain the aimed product.

Dilauric acid monoethanol amide polyethylene oxide ether sodium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:0.2 were mixed till homogenous, to obtain the surfactant composition 3-1, the particulars of which were listed in Table 1-3.

Bromooctadecane and N-(2-hydroxyethyl)ethylenediamine were introduced into a reactor, heated to a temperature of 80 degrees Celsius, reacted under stirring for 8 h and then stopped. The pressure was reduced to a vacuum of 0.9, under continuous stirring to remove any volatile from the reaction system, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of KOH, under continuous stirring, under benzene/water azeotropy, the ether product was totally converted into the corresponding potassium alkoxide. Into the reactor, there was added sodium chloroacetate, reacted for 2-10 h and then stopped the reaction, then adjusted to an acidic pH value, the resultant was washed twice with a 15 wt % NaCl aqueous solution, then adjusted with a NaOH aqueous solution, whereby converting the resultant into the corresponding sodium salt, removing by rotary evaporation the solvent from the product, to obtain the aimed product.

N-stearyl-N'-hydroxyethyl ethylenediamine polyethylene oxide ether sodium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:0.1 were mixed till homogenous, to obtain the surfactant composition 3-2, the particulars of which were listed in Table 1-3.

Example 10

N-benzyl-N-octyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, propylene oxide was introduced into the reactor, reacted for 5 h, then with the help of nitrogen gas at a pressure of 0.8 MPa, ethylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

Chlorooctadecane and a suitable amount of diethylenetriamine were introduced into a reactor, heated to a temperature of 80 degrees Celsius, reacted under stirring for 8 h and then stopped, purifying by chromatography the resultant 1,7-distearyl diethylenetriamine. The resultant and KOH were introduced into a reactor, heated to a temperature of 80 degrees Celsius, under continuous stirring to remove any volatile, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of KOH, under continuous stirring, under benzene/water azeotropy, the ether product was totally converted into the corresponding potassium alkoxide. Into the reactor, there was added sodium chloroacetate, reacted for 2-10 h, then adjusted to an acidic pH value, the resultant was washed twice with a 15 wt % NaCl aqueous solution, adjusted with aqueous ammonia, whereby converting the resultant into the corresponding ammonium salt, finally removing by rotary evaporation the solvent from the product, to obtain 1,7-distearyl diethylenetriamine polyethylene oxide ether ammonium carboxylate.

1,7-distearyl diethylenetriamine polyethylene oxide ether ammonium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:1.1 were mixed till homogenous, to obtain the surfactant composition 3-3, the particulars of which were listed in Table 1-3.

Methyl stearate, ethylenediamine and KOH were introduced into a reactor, heated to a temperature of 100 degrees Celsius, continuously removing by distillation the produced methanol, reacted for 8 h and then stopped, cooled to a temperature of 80 degrees Celsius, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of NaOH, under continuous stirring, under benzene/water azeotropy, the ether product was totally converted into the corresponding potassium alkoxide. Into the reactor, there was added sodium chloroacetate, reacted for 2-10 h and then stopped the reaction, then adjusted to an acidic pH value, the resultant was washed twice with a 15 wt % NaCl aqueous solution, adjusted with a calcium hydroxide aqueous solution, whereby converting the resultant into the corresponding calcium salt, finally removing by rotary evaporation the solvent from the product, to obtain 1-stearoyl ethylenediamine polyethylene oxide ether calcium carboxylate.

1-stearoyl ethylenediamine polyethylene oxide ether calcium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:2.2 were mixed till homogenous, to obtain the surfactant composition 3-4, the particulars of which were listed in Table 1-3.

Example 11

N,N-dicyclohexyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, propylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

1-chloro-9-octadecene and an excessive amount of diethylenetriamine were introduced into a reactor, heated to a temperature of 80 degrees Celsius, reacted under stirring for 8 h and then stopped, there was added a suitable amount of 1-chloro dodecane, reacted under stirring for 8 h and then purified by chromatography. The resultant and KOH were introduced into a reactor, heated to a temperature of 80 degrees Celsius, under continuous stirring to remove any volatile from the reaction system, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of NaOH, under continuous stirring, under benzene/water azeotropy, the ether product was totally converted into the corresponding potassium alkoxide. Into the reactor, there was added sodium chloroacetate, reacted for 2-10 h and then stopped the reaction, then adjusted to an acidic pH value, the resultant was washed twice with a 15 wt % NaCl aqueous solution, adjusted with a calcium hydroxide aqueous solution whereby converting the resultant into the corresponding calcium salt, finally removing by rotary evaporation the solvent from the product, to obtain an anionic surfactant: 1-(9-octadecenyl)-7-dodecyl diethylenetriamine polyethylene oxide ether calcium carboxylate.

1-(9-octadecenyl)-7-dodecyl diethylenetriamine polyethylene oxide ether carboxylate calcium and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:9 were mixed till homogenous, to obtain the surfactant composition 3-5, the particulars of which were listed in Table 1-3.

Chloro-9-octadecene and an excessive amount of ethylenediamine were introduced into a reactor, heated to a temperature of 80 degrees Celsius, reacted under stirring for 8 h and then stopped, purifying by chromatography the resultant. The resultant and KOH were introduced into a reactor, heated to a temperature of 80 degrees Celsius, under continuous stirring to remove any volatile, replaced by nitrogen gas for 4 times, the pressure in the reactor was adjusted to 0.2 MPa, heated to a temperature of 160-200 degrees Celsius, with the help of nitrogen gas at a pressure of 0.8 MPa, propylene oxide was introduced into the reactor, reacted for 0.5-10 h to obtain an ether product. The reaction system was cooled to a temperature of 80 degrees Celsius, there were added benzene as the solvent and 3-5 parts of KOH, under continuous stirring, under benzene/water azeotropy, the ether product was totally converted into the corresponding potassium alkoxide. Into the reactor, there was added sodium chloroacetate and chloromethyl sodium sulfonate, reacted for 2-10 h, then adjusted to an acidic pH value, the resultant was washed twice with a 15 wt % NaCl aqueous solution, adjusted with a KOH aqueous solution, whereby converting the resultant into the corresponding potassium salt, finally removing by rotary evaporation the solvent from the product, to obtain 1-(9-octadecene) ethylenediamine polyethylene oxide ether sodium carboxylate polyethylene oxide ether potassium sulfonate.

1-(9-octadecene) ethylenediamine polyethylene oxide ether sodium carboxylate polyethylene oxide ether sodium sulfonate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:0.9 were mixed till homogenous, to obtain the surfactant composition 3-6, the particulars of which were listed in Table 1-3.

Example 12

N,N-dioctyl ethanolamine and KOH were introduced into a reactor, heated to a temperature of 80 degrees Celsius, the pressure was reduced to a vacuum of 0.9, stirred for 30 minutes to remove any volatile, the atmosphere in the reactor was replaced by nitrogen gas for 4 times, the pressure in the reactor was adjusted to 0.2 MPa. The reaction system was heated to a temperature of 220 degrees Celsius, with the help of nitrogen gas at a pressure of 0.8 MPa, propylene oxide was introduced into the reactor, reacted for 5 h, then with the help of nitrogen gas at a pressure of 0.8 MPa, ethylene oxide was introduced into the reactor, reacted for 5 h to obtain an ether product B. The ether product B was dissolved in absolute ethanol and formulated into a 40% solution, then added to the reactor, with the help of nitrogen gas at a pressure of 0.8 MPa, there was added a quaternizing agent. The reaction system was heated to a temperature of 80 degrees Celsius and then reacted for 3-10 h, depressurized to remove excessive quaternizing agent and the solvent, to obtain a quaternized product C. Then, the quaternized product C, benzene as the solvent and KOH were introduced into a reactor, heated to a temperature of 80 degrees Celsius under continuous stirring, water generated from the reaction was distilled away under azeotropy until the quaternized product C was totally converted into the corresponding potassium alkoxide. With the help of nitrogen gas at a pressure of 0.8 MPa, a blocking agent was introduced into the reactor, reacted for 5 h. The resultant was dissolved in plenty of absolute ethanol, then any inorganic salt generated was removed by filtration, then the solvent and the blocking agent were removed by vacuum distillation to obtain a cationic-nonionic surfactant.

1-chloro-9-octadecene and an excessive amount of diethylenetriamine were introduced into a reactor, heated to a temperature of 80 degrees Celsius, reacted under stirring for 8 h and then stopped, there was added a suitable amount of 1-chloro octadecane, reacted under stirring for 8 h and then purified by chromatography. The resultant and KOH were introduced into a reactor, heated to a temperature of 80 degrees Celsius, under continuous stirring to remove any volatile from the reaction system, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of KOH, under continuous stirring, under benzene/water azeotropy, the ether product was totally converted into the corresponding potassium alkoxide. Into the reactor, there was added sodium chloroacetate, reacted for 2-10 h and then stopped the reaction, then adjusted to an acidic pH value, the resultant was washed twice with a 15 wt % NaCl aqueous solution, adjusted with a MgOH aqueous solution whereby converting the resultant into the corresponding magnesium salt, finally removing by rotary evaporation the solvent from the product, to obtain 1-stearyl-7-(9-octadecenyl)diethylenetriamine polyethylene oxide ether magnesium carboxylate.

1-stearyl-7-(9-octadecenyl)diethylenetriamine polyethylene oxide ether magnesium carboxylate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:4.1 were mixed till homogenous, to obtain the surfactant composition 3-7, the particulars of which were listed in Table 1-3.

Chloro isoheptadecane and an excessive amount of ethylenediamine were introduced into a reactor, heated to a temperature of 80 degrees Celsius, reacted under stirring for 8 h and then stopped, purifying by chromatography the resultant. The resultant and KOH were introduced into a reactor, heated to a temperature of 80 degrees Celsius, under continuous stirring to remove any volatile, replaced by nitrogen gas for 4 times, the pressure in the reactor was adjusted to 0.2 MPa, heated to a temperature of 160-200 degrees Celsius, with the help of nitrogen gas at a pressure of 0.8 MPa, ethylene oxide was introduced into the reactor, reacted for 0.5-10 h to obtain an ether product. The reaction system was cooled to a temperature of 80 degrees Celsius, there were added benzene as the solvent and 3-5 parts of KOH, under continuous stirring, under benzene/water azeotropy, the ether product was totally converted into the corresponding potassium alkoxide. Into the reactor, there was added sodium chloroacetate and chloromethyl sodium sulfonate, reacted for 2-10 h, then adjusted to an acidic pH value, the resultant was washed twice with a 15 wt % NaCl aqueous solution, adjusted with aqueous ammonia, whereby converting the resultant into the corresponding ammonium salt, finally removing by rotary evaporation the solvent from the product, to obtain the aimed product.

N-isoheptadecanyl ethylenediamine polyethylene oxide ether ammonium carboxylate polyethylene oxide ether ammonium sulfonate and the thus produced cationic-nonionic surfactant were dissolved into water respectively, stirred for 30 minutes, and formulated into a 0.3 wt % aqueous solution, and then the thus obtained solutions at a ratio by molar between the cationic-nonionic surfactant and the anionic surfactant of 1:5.8 were mixed till homogenous, to obtain the surfactant composition 3-8, the particulars of which were listed in Table 1-3.

Example 13

The surfactant composition produced by Example 1-3 and a 0.15 wt % aqueous solution of polyacrylamide (having a molecular weight of 26000000) were mixed till homogenous, to obtain a composite surfactant composition.

TABLE 1-1

The particulars of the surfactant composition

| Composition No. | structure of the anionic surfactant $R-(\!(OCH_2CH_2)_{\overline{y}}-O-L-A(M)_r)_x$ | structure of the cationic-nonionic surfactant $Rh-\overset{R_1}{\underset{R_2}{\overset{|}{N^+}}}-L_1-(Ru_1-O)_{\overline{m1}}(Ru_2-O)_{\overline{n1}}L_2 \quad X^-$ | molar ratio between cationic-nonionic surfactant and anionic surfactant |
|---|---|---|---|
| 1-1 | R = undecyl, L = 0, O = 0, A = COO⁻, M = Na⁺, y = 0, r = 1, x = 1 | Rh = stearyl, R₁ = R₂ = octyl, L₁ = CH₂CH₂O, Ru₁ = CH(CH₃)CH₂, | 1:0.2 |

TABLE 1-1-continued

The particulars of the surfactant composition

| Composition No. | structure of the anionic surfactant $R\text{---}(OCH_2CH_2)_y\text{---}O\text{---}L\text{---}A(M)_r]_x$ | structure of the cationic-nonionic surfactant $Rh\text{---}\overset{R_1}{\underset{R_2}{N^+}}\text{---}L_1\text{---}(Ru_1\text{---}O)_{m1}\text{---}(Ru_2\text{---}O)_{n1}\text{---}L_2 \quad X^-$ | molar ratio between cationic-nonionic surfactant and anionic surfactant |
|---|---|---|---|
| 1-2 | R = stearyl, L = $CH_2$, A = $COO^-$, M = $K^+$, y = 34.5, r = 1, x = 1 | $Ru_2 = CH_2CH_2$, m1 = 4, n1 = 0, X = Cl, $L_2 = CH_3$ | 1:0.1 |
| 1-3 | R = 9-octadecenyl, L = $CH_2$, A = $COO^-$, M = $NH_4^+$, y = 21, r = 1, x = 1 | Rh = benzyl, $R_1 = R_2$ = allyl, $L_1 = CH_2CH_2O$, $Ru_1 = CH(CH_3)CH_2$, $Ru_2 = CH_2CH_2$, m1 = 18, n1 = 17, X = Br, $L_2 = CH_2CH_3$ | 1:1.1 |
| 1-4 | R = oleic imido ethyl, L = $CH_2$, A = $COO^-$, M = $Ca^{2+}$, y = 16, r = 0.5, x = 1 | | 1:2.2 |
| 1-5 | R = cyclohexyl, L = $CH_2$, A = $COO^-$, M = Na, y = 2.1, r = 1, x = 1 | Rh = 9-octadecenyl, $R_1 = R_2$ = cyclohexyl, $L_1 = CH_2CH_2O$, $Ru_1 = CH(CH_3)CH_2$, $Ru_2 = CH_2CH_2$, m1 = 1, n1 = 31, X = Cl, $L_2$ = benzyl | 1:9 |
| 1-6 | R = dodecyl, L = 0, O = 0, A = $SO_3^-$, M = $Mg^{2+}$, y = 0, r = 0.5, x = 1 | | 1:0.9 |
| 1-7 | R = (4-dodecyl) phenyl, L = $CH_2$, A = $COO^-$, M = $Ca^{2+}$, y = 41, r = 0.5, x = 1 | Rh = benzyl, $R_1 = R_2$ = octyl, $L_1 = CH_2CH_2O$, $Ru_1 = CH(CH_3)CH_2$, $Ru_2 = CH_2CH_2$, m1 = 0, n1 = 26, X = I, $L_2$ = cyclohexyl | 1:4.1 |
| 1-8 | R = 4,4'-(1-methyl ethylene)bisphenyl, L = $CH_2$, A = $COO^-$ or $SO_3^{2-}$, M = $Ca^{2+}$, y = 1.8, r = 0.5, x = 2, | | 1:5.8 |

TABLE 1-2

The particulars of the surfactant composition

| Composition No. | structure of the anionic surfactant $(Ra)_b\text{---}\underset{*}{\bigcirc}\text{---}[Ra'\text{---}Y\underset{\underset{[(CH_2CH_2O)_{n''}\text{---}L''\text{---}A''(M)_r]_a}{\mid}}{(CH_2CH_2O)_{n'}\text{---}L'\text{---}A'(M)_r}]_{x'}$ | $Rb\text{---}[Rb'\text{---}Y\underset{\underset{[(CH_2CH_2O)_{n''}\text{---}L''\text{---}A''(M)_r]_a}{\mid}}{(CH_2CH_2O)_{n'}\text{---}L'\text{---}A'(M)_r}]_{x'}$ |
|---|---|---|
| 2-1 | Ra = octyl, b = 1, Ra' = single bond, Y = O, n' = 17, a = 0, x' = 1, L' = $CH_2$, A' = $COO^-$, M = $Na^+$, r = 1 | |
| 2-2 | | Rb = dodecyl, Rb' = single bond, Y = O, n' = 17, a = 0, x' = 1, L' = $CH_2$, A' = $COO^-$, M = $Na^+$, r = 1 |
| 2-3 | Ra = tristyryl, b = 1, Ra' = single bond, Y = O, n' = 4, a = 0, x' = 1, L' = $CH_2$, A' = $COO^-$, M = $Ca^{2+}$, r = 0.5 | |
| 2-4 | | Rb = 9-octadecenyl, Rb' = single bond, Y = O, n' = 29, a = 0, x' = 1, L' = $CH_2$, A' = $COO^-$, M = $NH_4^+$, r = 1 |
| 2-5 | Ra = (4-hexadecyl)phenyl, b = 1, Ra' = single bond, Y = N, n' + n'' = 38, a = 1, x' = 1, L' = L'' = $CH_2$, A' = A'' = $COO^-$, M = $K^+$, r = 1 | |
| 2-6 | | Rb = lauroyl, Rb' = single bond, Y = N, n' + n'' = 7, a = 1, x' = 1, L' = L'' = $CH_2$, A' = $COO^-$, M = $Mg^{2+}$, r = 0.5, |
| 2-7 | Ra = octyl, b = 2, Ra' = single bond, Y = N, n' + n'' = 47, a = 1, x' = 1, L' = $CH_2$, L'' = $CH_2CH_2$, A' = $COO^-$ or $SO_3^{2-}$, M = $NH_4^+$, r = 1 | |
| 2-8 | | Rb = oleoyl, Rb' = single bond, Y = N, n' + n'' = 17, a = 1, x' = 1, L' = L'' = $CH_2$, A' = $COO^-$, M = $K^+$, r = 1, |

TABLE 1-2-continued

The particulars of the surfactant composition structure of the cationic-nonionic surfactant $$Rh-\underset{R_2}{\overset{R_1}{\underset{|}{N^+}}}-L_1-(Ru_1-O)_{\overline{m1}}(Ru_2-O)_{\overline{n1}}L_2 \quad X^-$$

| Composition No. | structure of the cationic-nonionic surfactant | molar ratio between cationic-nonionic surfactant and anionic surfactant |
|---|---|---|
| 2-1 | Rh = benzyl, $R_1$ = cyclohexyl, | 1:0.3 |
| 2-2 | $R_2$ = dodecyl, $L_1$ = $CH_2CH_2O$, | 1:0.1 |
|  | $Ru_1$ = $CH(CH_3)CH_2$, |  |
|  | $Ru_2$ = $CH_2CH_2$, m1 = 7, n1 = 10, |  |
|  | X = Cl, $L_2$ = H |  |
| 2-3 | Rh = dodecyl, $R_1$ = benzyl, | 1:1.2 |
| 2-4 | $R_2$ = octyl, $L_1$ = $CH_2CH_2O$, | 1:2.0 |
|  | $Ru_1$ = $CH_2CH_2$, |  |
|  | $Ru_2$ = $CH(CH_3)CH_2$, m1 = 18, |  |
|  | n1 = 17, X = Br, $L_2$ = $CH_2CH_3$ |  |
| 2-5 | Rh = 9-octadecenyl, | 1:10 |
| 2-6 | $R_1$ = $R_2$ = cyclohexyl, | 1:0.9 |
|  | $L_1$ = $CH_2CH_2O$, |  |
|  | $Ru_1$ = $CH(CH_3)CH_2$, |  |
|  | $Ru_2$ = $CH_2CH_2$, m1 = 1, n1 = 31, |  |
|  | X = Cl, $L_2$ = $CH_3$ |  |
| 2-7 | Rh = allyl, $R_1$ = $R_2$ = octyl, | 1:4 |
| 2-8 | $L_1$ = $CH_2CH_2O$, | 1:6 |
|  | $Ru_1$ = $CH(CH_3)CH_2$, |  |
|  | $Ru_2$ = $CH_2CH_2$, m1 = 37, n1 = 33, |  |
|  | X = I, $L_2$ = $CH_3$ |  |

TABLE 1-3

The particulars of the surfactant composition structure of the anionic surfactant

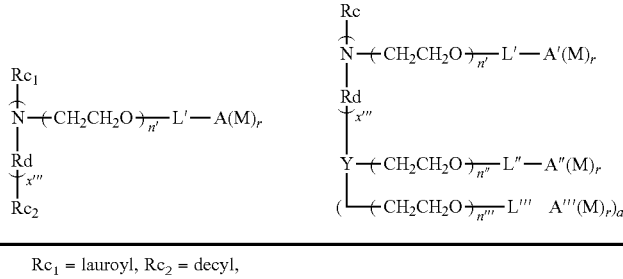

| Composition No. | | |
|---|---|---|
| 3-1 | $Rc_1$ = lauroyl, $Rc_2$ = decyl, Rd = $CH_2CO$, x''' = 1, n' = 13, L' = $CH_2$, A' = COO, M = $Na^+$, r = 1 | |
| 3-2 | | Rc = stearyl, Rd = $CH_2CH_2$, x'''' = 1, n' + n'' = 17, Y = O, L' = L'' = $CH_2$, A' = A'' = COO, M = $Na^+$, r = 1, |
| 3-3 | $Rc_1$ = stearyl, $Rc_2$ = hexadecyl Rd = $CH_2CH_2$, x''' = 3, n' = 39, L' = $CH_2$, A' = COO, M = $NH_4^+$, r = 1 | |
| 3-4 | | Rc = stearoyl, Rd = $CH_2CH_2$, x'''' = 1, n' + n'' + n''' = 26, L' = L'' = L''' = $CH_2$, A' = A'' = A''' = $COO^-$, M = $Ca^{2+}$, r = 0.5, Y = N, a = 1 |
| 3-5 | $Rc_1$ = 9-octadecenyl, $Rc_2$ = decyl, Rd = $CH_2CH_2$, x''' = 3, n' = 27, L' = $CH_2$, A' = COO, M = $Ca^{2+}$, r = 0.5 | |
| 3-6 | | Rc = 9-octadecenyl, Rd = $CH_2CH_2$, x'''' = 1, n' + n'' + n''' = 26, L' = L'' = $CH_2$, L''' = $CH_2CH_2$ A' = A'' = COO, A''' = $SO_3^{2-}$, M = K, r = 1, Y = N, a = 1 |
| 3-7 | $Rc_1$ = stearyl, $Rc_2$ = 9-octadecenyl, Rd = $CH_2CH_2$, x''' = 3, n' = 27, L' = $CH_2$, A' = COO, M = $Mg^{2+}$, r = 0.5 | |

TABLE 1-3-continued

The particulars of the surfactant composition 3-8   Rc = isoheptadecanyl, Rd = $CH_2CH_2$,
      x'''' = 1, n' + n'' + n''' = 48, L' = L'' = $CH_2$,
      L''' = $CH_2CH_2$ A' = COO, A'' = A''' = $SO_3^{2-}$,
      M = $NH_4^+$, r = 1, Y = N, a = 1

| Composition No. | structure of the cationic-nonionic surfactant $Rh-\overset{R_1}{\underset{R_2}{\overset{\mid}{N^+}}}-L_1-(Ru_1-O)_{\overline{m1}}(Ru_2-O)_{\overline{n1}}-L_2 \quad X^-$ | molar ratio between cationic-nonionic surfactant and anionic surfactant |
|---|---|---|
| 3-1 | Rh = benzyl, $R_1$ = cyclohexyl, | 1:0.2 |
| 3-2 | $R_2$ = dodecyl, $L_1$ = $CH_2CH_2O$, | 1:0.1 |
|     | $Ru_1$ = $CH_2CH_2$, $Ru_2$ = $CH(CH_3)CH_2$, |  |
|     | m1 = 4, n1 = 10, X = Cl, $L_2$ = $CH_3$ |  |
| 3-3 | Rh = dodecyl, $R_1$ = benzyl, $R_2$ = octyl, | 1:1.1 |
| 3-4 | $L_1$ = $CH_2CH_2O$, $Ru_1$ = $CH(CH_3)CH_2$, | 1:2.2 |
|     | $Ru_2$ = $CH_2CH_2$, m1 = 18, n1 = 17, X = Br, |  |
|     | $L_2$ = $CH_2CH_3$ |  |
| 3-5 | Rh = 9-octadecenyl, | 1:9 |
| 3-6 | $R_1$ = $R_2$ = cyclohexyl, $L_1$ = $CH_2CH_2O$, | 1:0.9 |
|     | $Ru_1$ = $CH(CH_3)CH_2$, $Ru_2$ = $CH_2CH_2$, |  |
|     | m1 = 1, n1 = 0, X = Cl, $L_2$ = H |  |
| 3-7 | Rh = allyl, $R_1$ = $R_2$ = octyl, | 1:4.1 |
| 3-8 | $L_1$ = $CH_2CH_2O$, $Ru_1$ = $CH(CH_3)CH_2$, | 1:5.8 |
|     | $Ru_2$ = $CH_2CH_2$, m1 = 21, n1 = 26, X = I, |  |
|     | $L_2$ = $CH_3$ |  |

Example 14 Interfacial Performance Test of the Surfactant Composition

TX-500C type spinning drop interfacial tensiometer was used to identify the oil-water interfacial tension between each surfactant composition and the IV5-11 reservoir crude oil from the Henan Shuanghe Oilfield, at a surfactant composition concentration of 0.3 wt %, with a test temperature of 81 degrees Celsius, a formation water of $NaHCO_3$ type, a TDS of 7947 mg/L, a chloride ion content of 2002 mg/L, a $Ca^{2+}$ content of 20 mg/L, a $Mg^{2+}$ content of 12.2 mg/L.

TABLE 2

The oil-water interfacial tension between the surfactant composition and the IV5-11 reservoir crude oil from the Henan Shuanghe Oilfield

| Surfactant composition | interfacial tension (mN/m) |
|---|---|
| 1-1 | 0.007 |
| 1-2 | 0.008 |
| 1-3 | 0.0002 |
| 1-4 | 0.0004 |
| 1-5 | 0.0007 |
| 1-6 | 0.01 |
| 1-7 | 0.02 |
| 1-8 | 0.03 |
| 2-1 | 0.0006 |
| 2-2 | 0.0003 |
| 2-3 | 0.0021 |
| 2-4 | 0.0033 |
| 2-5 | 0.0005 |
| 2-6 | 0.0006 |
| 2-7 | 0.0009 |
| 2-8 | 0.001 |
| 3-1 | 0.003 |
| 3-2 | 0.004 |
| 3-3 | 0.0005 |
| 3-4 | 0.0004 |
| 3-5 | 0.008 |
| 3-6 | 0.006 |
| 3-7 | 0.0004 |
| 3-8 | 0.0005 |
| 13 | 0.0002 |

As can be seen from Table 2, the surfactant composition produced by each of Examples 1 to 12 exhibits desirable interfacial performance with the crude oil from the Henan Oilfield. Example 13 reveals that, the thus produced surfactant composition still exhibits desirable interfacial performance, even after compounded with a polymer.

The surfactant composition produced by Example 13 was formulated into different concentrations, each was tested the oil-water interfacial tension with the IV5-11 reservoir crude oil from the Henan Shuanghe Oilfield. The results were listed in Table 3.

TABLE 3

The oil-water interfacial tension between the surfactant composition 1-3 (at different concentrations) and the IV5-11 reservoir crude oil from the Henan Shuanghe Oilfield

| surfactant composition concentration (wt %) | 0.01 | 0.02 | 0.05 | 0.1 | 0.2 | 0.3 |
|---|---|---|---|---|---|---|
| interfacial tension (mN/m) | 0.005 | 0.0025 | 0.0009 | 0.0004 | 0.0002 | 0.0002 |

These results reveals that, the surfactant composition of this invention exhibits a relatively higher oil-water interfacial activity for the crude oil from the Henan Oilfield.

TX-500C type spinning drop interfacial tensiometer was used to identify the oil-water interfacial tension between the surfactant composition produced by Example 1-4 and a crude oil from the third oil plant of the Zhongyuan Oilfield, with a test temperature of 80 degrees Celsius, a formation water with a TDS of 79439 mg/L, a $Ca^{2+}$ content of 592 mg/L, a $Mg^{2+}$ content of 2871 mg/L, a surfactant composition concentration of 0.3 wt %. The oil-water interfacial tension was observed as low as 0.003 mN/m. This reveals that the surfactant composition of this invention shows versatile applicability, not only to a reservoir with a low TDS, but also to a reservoir at elevated temperatures and high salinity, with desirable interfacial performances.

Example 15 Oil Washing Capability Test of the Surfactant Composition

The IV5-11 reservoir oil sand from the Henan Shuanghe Oilfield at an oil:sand ratio of 1:4 (by weight) was aged at 81 degrees Celsius for 7 days, stirred for 5 minutes every 2 hours. Then 5 g of the thus aged oil sand and a 0.3 wt % solution of the surfactant composition at an oil sand:solution ratio of 1:10 (by weight) were mixed till homogenous, aged at the reservoir temperature for 48 h, then crude oil in the solution was extracted with petroleum ether, adjusted with a 50 ml colorimetric tube to a metered volume, colorimetric analyzed with a spectrophotometer at a wavelength of 430 nm. The concentration of crude oil in the surfactant solution was calculated by referring to the standard curve.

TABLE 4

The oil washing performance of the surfactant composition

| Surfactant composition | Oil washing rate % |
|---|---|
| 1-1 | 63.1 |
| 1-2 | 62.3 |
| 1-3 | 77 |
| 1-4 | 74 |
| 1-5 | 76 |
| 1-6 | 58 |
| 1-7 | 50.3 |
| 1-8 | 49 |
| 2-1 | 75.1 |
| 2-2 | 76.0 |
| 2-3 | 63.9 |
| 2-4 | 64 |
| 2-5 | 74.2 |
| 2-6 | 75.3 |
| 2-7 | 68 |
| 2-8 | 66.7 |
| 3-1 | 63.6 |
| 3-2 | 64.3 |
| 3-3 | 74.1 |
| 3-4 | 73.2 |
| 3-5 | 60.2 |
| 3-6 | 61.3 |
| 3-7 | 74.2 |
| 3-8 | 72.3 |
| 13 | 77 |

Example 16 Study on the Oil Displacement Performance of the Surfactant Composition The oil displacement test was performed on a cylindrical natural core of sandstone having a length of 30 cm, a diameter of 2.5 cm and a permeability of 1.5 $\mu m^2$. The core was firstly injected with the IV5-11 reservoir formation water from the Henan Shuanghe Oilfield till no crude oil was found in the effluent, then with a 0.3 PV (pore volume of the core) of the surfactant composition, then with water till no crude oil was found in the effluent. The results were listed in Table 5.

TABLE 5

Oil displacement test results of the surfactant composition

| Surfactant composition | Increased oil recovery % OOIP |
|---|---|
| 1-1 | 6.9 |
| 1-2 | 7.7 |

TABLE 5-continued

Oil displacement test results of the surfactant composition

| Surfactant composition | Increased oil recovery % OOIP |
|---|---|
| 1-3 | 9.1 |
| 1-4 | 8.6 |
| 1-5 | 8.5 |
| 1-6 | 5.2 |
| 1-7 | 3.3 |
| 1-8 | 3.4 |
| 2-1 | 7.8 |
| 2-2 | 8.7 |
| 2-3 | 6.3 |
| 2-4 | 6.0 |
| 2-5 | 7.9 |
| 2-6 | 7.7 |
| 2-7 | 7.5 |
| 2-8 | 7.3 |
| 3-1 | 6.8 |
| 3-2 | 6.5 |
| 3-3 | 8.2 |
| 3-4 | 8.1 |
| 3-5 | 6.3 |
| 3-6 | 7.2 |
| 3-7 | 8.3 |
| 3-8 | 8.5 |
| 13 | 10.7 |

Comparative Example 1

According to Gong Yujun et. al, Journal of Northwest University (Natural Science Edition), Vol. 30 (1), pp. 28 to 31, February 2000, hexadecyl trimethyl ammonium bromide (CTAB) and sodium dodecyl sulfate (SDS) were combined at a ratio by molar of 1:1.5, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE 6

Performances of the reference flooding fluid

| interfacial tension (mN/m) | oil washing rate % | increased oil recovery % OOIP |
|---|---|---|
| 0.03 | 45.6 | 2.8 |

Comparative Example 2

According to Huang Hongdu et. al, Journal of Oil and Gas Technology, Vol. 29(4), August 2007 (pp. 101 to 104), 0.01 wt % hexadecyl trimethyl ammonium bromide, 0.02 wt % anionic petroleum sulfonate salt and 1.8 wt % $Na_2CO_3$ were combined, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE 7

Performances of the reference flooding fluid

| interfacial tension (mN/m) | oil washing rate % | increased oil recovery % OOIP |
|---|---|---|
| 0.008 | 56.3 | 4.2 |

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A surfactant composition, comprising a cationic-nonionic surfactant and an anionic surfactant, wherein the molar ratio of the cationic-nonionic surfactant and the anionic surfactant is 1:0.01-100, wherein the anionic surfactant is one or more compound selected from the group consisting of a compound represented by formula (I-1), a compound represented by formula (I-2), a compound represented by formula (I-3), and a compound represented by formula (I-4), wherein, in the compound represented by formula (I-1):

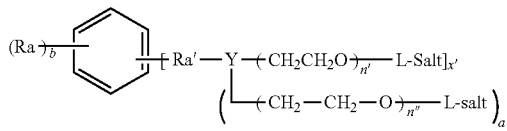

(I-1)

plural group Ra are identical to or different from one another, each independently selected from the group consisting of an optionally substituted $C_{1-20}$ linear or branched alkyl, an optionally substituted $C_{2-20}$ linear or branched alkenyl, and an optionally substituted $C_{6-10}$ aryl;

plural group Ra' are identical to or different from one another, each independently selected from the group consisting of a single bond, an optionally substituted $C_{1-10}$ linear or branched alkylene, an optionally substituted $C_{2-10}$ linear or branched alkenylene, carbonyl, an optionally substituted $C_{1-10}$ linear or branched alkylene carbonyl, and an optionally substituted $C_{2-10}$ linear or branched alkenylene carbonyl, the numerical value b represents an integer of from 0 to 3, the numerical value x' represents an integer from 2 to 4, wherein the group Y represents N, and a=1, plural numerical value n' are identical to or different from one another, each independently represents a value of from 0 to 100, plural numerical value n" are identical to or different from one another, each independently represents a value of from 0 to 100, with the proviso that the sum of all numerical value n' and all numerical value n" is greater than 0 and not greater than 100, plural group L are identical to or different from one another, each independently selected from the group consisting of an optionally substituted $C_{1-10}$ linear or branched alkylene and an optionally substituted $C_{2-10}$ linear or branched alkenylene, plural group Salt are identical to or different from one another, each independently represents a group represented by the formula $-A^-(M)_r^+$, wherein the group $A^-$ represents a carboxylate ion ($COO^-$) or a sulfonate ion ($SO_3^-$), with the proviso that, in at least one group Salt, the group $A^-$ represents the carboxylate ion ($COO^-$), the group M represents alkali metal, alkaline earth metal or ammonium ($NH_4$), and wherein when the group M represents alkali metal or ammonium, r=1; when the group M represents alkaline earth metal, r=0.5;

wherein, in the compound represented by formula (I-2):

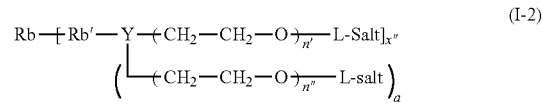

(I-2)

the group Rb represents an
optionally substituted $C_{1-50}$ linear or branched alkyl, an optionally substituted $C_{5-50}$ monocyclic or polycyclic cycloalkyl or an optionally substituted $C_{2-50}$ linear or branched alkenyl, plural group Rb' are identical to or different from one another, each independently is a single bond and carbonyl, the numerical value x" represents an integer of from 2 to 4, wherein the group Y represents N, and a=1, plural numerical value n' are identical to or different from one another, each independently represents a value of from 0 to 100, plural numerical value n" are identical to or different from one another, each independently represents a value of from 0 to 100, with the proviso that the sum of all numerical value n' and all numerical value n" is greater than 0 and not greater than 100, plural group L are identical to or different from one another, each independently selected from the group consisting of an optionally substituted $C_{1-10}$ linear or branched alkylene and an optionally substituted $C_{2-10}$ linear or branched alkenylene, plural group Salt are identical to or different from one another, each independently represents a group represented by the formula $-A^-(M)_r^+$, wherein the group $A^-$ represents a carboxylate ion ($COO^-$) or a sulfonate ion ($SO_3^-$), with the proviso that, in at least one group Salt, the group $A^-$ represents the carboxylate ion ($COO^-$), the group M represents alkali metal, alkaline earth metal or ammonium ($NH_4$), and wherein when the group M represents alkali metal or ammonium, r=1; when the group M represents alkaline earth metal, r=0.5;

wherein, in the compound represented by formula (I-3)

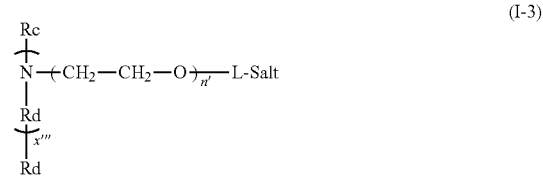

(I-3)

plural group Rc are identical to or different from one another, each independently selected from the group consisting of an optionally substituted $C_{1-20}$ linear or branched alkyl, an optionally substituted $C_{2-20}$ linear or branched alkenyl, an optionally substituted $C_{1-20}$ linear or branched alkyl carbonyl, and an optionally substituted $C_{2-20}$ linear or branched alkenyl carbonyl, plural group Rd are identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl, and an optionally substituted carbonyl $C_{2-10}$ linear or branched alkenylene carbonyl, the numerical value x''' represents an integer of from 2 to 4, plural numerical value n' are identical to or different from one another, each independently represents a value of from 0 to 100, with the proviso that the sum of all numerical values n' is greater than 0 and not greater than 100, plural group L are identical to or different from one another, each independently selected from the group consisting of an optionally substituted $C_{1-10}$ linear or branched alkylene and an optionally substituted $C_{2-10}$ linear or branched alkenylene, plural group Salt are identical to or different from one another, each independently represents a group represented by the formula $-A^-(M)_r^+$, wherein the group $A^-$ represents a carboxylate ion ($COO^-$) or a sulfonate ion ($SO_3^-$), with the proviso that, in at least one group Salt, the group $A^-$ represents the carboxylate ion ($COO^-$), the group M represents alkali metal, alkaline earth metal or ammonium ($NH_4$), and wherein when the group M represents alkali metal or ammonium, r=1; when the group M represents alkaline earth metal, r=0.5; and wherein, in the compound represented by formula (I-4):

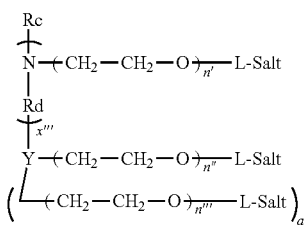

(I-4)

the group Rc represents an optionally substituted $C_{1-20}$ linear or branched alkyl, an optionally substituted $C_{2-20}$ linear or branched alkenyl, an optionally substituted $C_{1-20}$ linear or branched alkyl carbonyl or an optionally substituted $C_{2-20}$ linear or branched alkenyl carbonyl, plural group Rd are identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl, and an optionally substituted carbonyl $C_{2-10}$ linear or branched alkenylene carbonyl, the numerical value x'''' represents an integer of from 1 to 9, the group Y represents N, and a=1, plural numerical value n' are identical to or different from one another, each independently represents a value of from 0 to 100, plural numerical value n'' are identical to or different from one another, each independently represents a value of from 0 to 100, plural numerical value n''' are identical to or different from one another, each independently represents a value of from 0 to 100, with the proviso that the sum of all numerical values n', all numerical values n'' and all numerical values n''' is greater than 0 and not greater than 100, plural group L are identical to or different from one another, each independently selected from the group consisting of an optionally substituted $C_{1-10}$ linear or branched alkylene and an optionally substituted $C_{2-10}$ linear or branched alkenylene, plural group Salt are identical to or different from one another, each independently represents a group represented by the formula $-A^-(M)_r^+$, wherein the group $A^-$ represents a carboxylate ion ($COO^-$) or a sulfonate ion ($SO_3^-$), with the proviso that, in at least one group Salt, the group $A^-$ represents the carboxylate ion ($COO^-$), the group M represents alkali metal, alkaline earth metal or ammonium ($NH_4$), and wherein when the group M represents alkali metal or ammonium, r=1; when the group M represents alkaline earth metal, r=0.5, and the cationic-nonionic surfactant is one or more compound represented by formula (II):

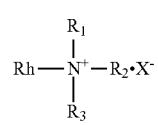

(II)

wherein:

the group N' represents a quaternary nitrogen cation, the groups $R_1$ to $R_3$ may be identical to or different from one another, each independently selected from the group consisting of an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl, an optionally substituted $C_{6-50}$ aryl, and a group represented by the formula

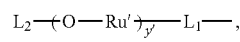

wherein at least one of $R_1$ to $R_3$ is represented by the formula

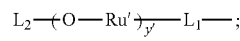

the group Rh represents an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl or an optionally substituted $C_{6-50}$ aryl;

the group $L_1$ represents a single bond, a $C_{1-10}$ linear or branched alkylene oxy, a $C_{2-10}$ linear or branched alkenylene oxy or a $C_{6-10}$ arylene oxy;

the numerical value y' represents a value of from 0 to 200, excluding 0;

plural group Ru' may be identical to or different from one another, each independently represents a $C_{2-6}$ linear or branched alkylene;

the group $L_2$ represents hydrogen, an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl or an optionally substituted $C_{6-50}$ aryl;

the group X" represents a halogen ion or hydroxide ion (OH⁻), wherein the term "optionally substituted" refers to having an option of containing one or more substituent selected from the group consisting of a $C_{1-20}$ linear or branched alkyl, a $C_{5-10}$ monocyclic or polycyclic cycloalkyl, a $C_{2-20}$ linear or branched alkenyl, and a $C_{6-20}$ aryl.

2. The surfactant composition according to claim 1, wherein the group

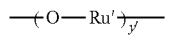

is an ether segment represented by the formula

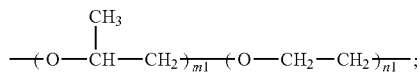

wherein:

the numerical value m1 represents a value of from 0 to 100;

the numerical value n1 represents a value of from 0 to 100, with the proviso that the sum of the numerical value m1 and the numerical value n1 is greater than 0 and not greater than 200.

3. The surfactant composition according to claim 1, wherein:

in the formula (I-1), plural group Ra are identical to or different from one another, each independently selected from the group consisting of an optionally substituted $C_{5-15}$ linear or branched alkyl and an optionally substituted $C_{6-10}$ aryl, plural group Ra' are identical to or different from one another, each independently selected from the group consisting of a single bond and an optionally substituted $C_{1-6}$ linear or branched alkylene, the numerical value b is 1, the numerical value x' represents an integer from 2 to 4, plural numerical value n' are identical to or different from one another, each independently represents a value of from 0 to 50, plural numerical value n" are identical to or different from one another, each independently represents a value of from 0 to 50, with the proviso that the sum of all numerical value n' and all numerical value n" is greater than 0 and not greater than 50, plural group L are identical to or different from one another, each independently selected from the group consisting of an optionally substituted $C_{1-5}$ linear or branched alkylene, plural group Salt are identical to or different from one another, each independently represents a group represented by the formula $-A^-(M)_r^+$, wherein the group $A^-$ represents a carboxylate ion (COO⁻) or a sulfonate ion (SO₃⁻), with the proviso that, in at least one group Salt, the group $A^-$ represents the carboxylate ion (COO⁻), the group M represents Li, Na, K, Mg, Ca or ammonium (NH₄), and wherein when the group M represents Li, Na, K or ammonium, r=1; when the group M represents Mg, or Ca, r=0.5;

in the formula (I-2), the group Rb represents an optionally substituted $C_{5-20}$ linear or branched alkyl, an optionally substituted $C_{5-8}$ monocyclic or polycyclic cycloalkyl or an optionally substituted $C_{5-20}$ linear or branched alkenyl, the numerical value x" represents an integer from 2 to 4, plural numerical value n' are identical to or different from one another, each independently represents a value of from 0 to 50, plural numerical value n" are identical to or different from one another, each independently represents a value of from 0 to 50, with the proviso that the sum of all numerical value n' and all numerical value n" is greater than 0 and not greater than 50, plural group L are identical to or different from one another, each independently represents an optionally substituted $C_{1-5}$ linear or branched alkylene, plural group Salt may be identical to or different from one another, each independently represents a group represented by the formula $-A^-(M)_r^+$, wherein the group $A^-$ represents a carboxylate ion (COO⁻) or a sulfonate ion (SO₃⁻), with the proviso that, in at least one group Salt, the group $A^-$ represents the carboxylate ion (COO⁻), the group M represents Li, Na, K, Mg, Ca or ammonium (NH₄), and wherein when the group M represents Li, Na, K or ammonium, r=1; when the group M represents Mg, or Ca, r=0.5;

in the formula (I-3), plural group Rc are identical to or different from one another, each independently selected from the group consisting of an optionally substituted $C_{5-20}$ linear or branched alkyl, an optionally substituted $C_{5-20}$ linear or branched alkenyl, an optionally substituted $C_{5-20}$ linear or branched alkyl carbonyl, and an optionally substituted $C_{5-20}$ linear or branched alkenyl carbonyl, plural group Rd are identical to or different from one another, each independently selected from the group consisting of an optionally substituted $C_{1-5}$ linear or branched alkylene and an optionally substituted $C_{1-5}$ linear or branched alkylene carbonyl, the numerical value x"" represents an integer from 2 to 4, plural numerical value n' are identical to or different from one another, each independently represents a value of from 0 to 50, with the proviso that the sum of all numerical values n' is greater than 0 and not greater than 50, plural group L are identical to or different from one another, each independently represents an optionally substituted $C_{1-5}$ linear or branched alkylene, plural group Salt are identical to or different from one another, each independently represents a group represented by the formula $-A^-(M)_r^+$, wherein the group $A^-$ represents a carboxylate ion (COO⁻) or a sulfonate ion (SO₃⁻), with the proviso that, in at least one group Salt, the group $A^-$ represents the carboxylate ion (COO⁻), the group M represents Li, Na, K, Mg, Ca or ammonium (NH₄), and wherein when the group M represents Li, Na, K, or ammonium, r=1; when the group M represents Mg, or Ca, r=0.5; and in the formula (I-4), the group Rc represents an optionally substituted $C_{5-20}$ linear or branched alkyl, an optionally substituted $C_{5-20}$ linear or branched alkenyl, an optionally substituted $C_{5-20}$ linear or branched alkyl carbonyl or an optionally substituted $C_{5-20}$ linear or branched alkenyl carbonyl, plural group Rd are identical to or different from one another, each independently selected from the group consisting of an optionally substituted $C_{1-5}$ linear or branched alkylene and an optionally substituted $C_{1-5}$ linear or branched alkylene carbonyl, the numerical value x"" represents an integer from 1 to 3, plural numerical value n' are identical to or different from one another, each independently represents a value of from 0 to 50, plural numerical value n" are identical to or different from one another, each independently represents a value of from 0 to 50, plural numerical value n''' are identical to or different from one another, each independently represents a value of from 0 to 50, with the proviso that the sum of all numerical values n', all numerical values n" and all numerical values n''' is greater than 0 and not greater than 50, plural group L are identical to or different from one another, each independently represents an optionally substituted $C_{1-5}$ linear or branched alkylene, plural group Salt are identical to or different from one another, each independently represents a group represented by the formula $-A^-(M)_r^+$, wherein the group $A^-$ represents a carboxylate ion ($COO^-$) or a sulfonate ion ($SO_3^-$), with the proviso that, in at least one group Salt, the group $A^-$ represents the carboxylate ion ($COO^-$), the group M represents Li, Na, K, Mg, Ca or ammonium ($NH_4$), and wherein when the group M represents Li, Na, K, or ammonium, r=1; when the group M represents Mg, or Ca, r=0.5.

4. The surfactant composition according to claim 3, wherein:

in the formulas (I-1), (I-2), (I-3), and (I-4), the group $A^-$ represents the carboxylate ion ($COO^-$).

5. A surfactant composition obtained by mixing the anionic surfactant represented by any of the formulas (I-1), (I-2), (I-3) and (I-4) as defined in claim 1 and the cationic-nonionic surfactant represented by the formula (II) as defined in claim 1, and the molar ratio of the cationic-nonionic surfactant and the anionic surfactant is 1:0.01-100.

6. A flooding fluid composition for tertiary oil recovery, comprising the surfactant composition according to claim 1 and water, wherein the surfactant composition accounts for 0.001-10 wt % relative to the total weight of the flooding fluid composition as 100 wt %.

7. The flooding fluid composition for tertiary oil recovery according to claim 6, further comprising a cationic water-soluble polymer.

8. The flooding fluid composition for tertiary oil recovery according to claim 7, wherein the cationic water-soluble polymer is a polyacrylamide, present in an amount of 0.05-5.0 wt %, on the basis of the total weight of the flooding fluid composition.

9. The flooding fluid composition for tertiary oil recovery according to claim 6, comprising no inorganic alkali.

10. A tertiary oil recovery process, wherein the process comprising conducting tertiary oil recovery in the presence of a flooding fluid comprising the surfactant composition according to claim 1.

11. The tertiary oil recovery process according to claim 10, wherein no inorganic alkali is used.

\* \* \* \* \*